United States Patent
MacMichael et al.

(10) Patent No.: US 7,868,260 B2
(45) Date of Patent: *Jan. 11, 2011

(54) APPARATUS AND METHOD FOR DISPENSING SMALL QUANTITIES OF PARTICLES

(75) Inventors: Bruce MacMichael, Ickleford (GB); Duncan Westland, Melbourne (GB)

(73) Assignee: Powderject Research Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/035,037

(22) Filed: Feb. 21, 2008

(65) Prior Publication Data

US 2008/0142277 A1    Jun. 19, 2008

Related U.S. Application Data

(63) Continuation of application No. 11/112,545, filed on Apr. 21, 2005, now Pat. No. 7,358,451, which is a continuation of application No. 10/129,463, filed as application No. PCT/GB00/04220 on Nov. 3, 2000, now Pat. No. 6,987,228.

(30) Foreign Application Priority Data

Nov. 5, 1999    (GB) ................... 9926335.2

(51) Int. Cl.
*G01G 13/04*    (2006.01)
(52) U.S. Cl. .................. 177/108; 177/116; 177/121; 222/198; 222/200; 222/202; 141/83
(58) Field of Classification Search .............. 222/55, 222/56, 77, 196, 200, 202; 141/83; 177/105, 177/108, 116, 119, 121

See application file for complete search history.

(56) References Cited

U.S. PATENT DOCUMENTS 1,542,430 A    6/1925    Wever (Continued)

FOREIGN PATENT DOCUMENTS

DE    1269051    11/1963

(Continued)

OTHER PUBLICATIONS

International Preliminary Examination Report for corresponding international application No. PCT/GB00/04220, dated Feb. 15, 2005. (18 pgs.).

(Continued)

*Primary Examiner*—Randy W Gibson
(74) *Attorney, Agent, or Firm*—Foley & Lardner LLP

(57) ABSTRACT

There is disclosed an apparatus and method which is capable of dispensing very small (typically less than 5 mg) quantities of particles to a high accuracy in a repeatable way and without undue wastage. Also, the need for advanced particle formulation is reduced. The apparatus comprises a closed loop control system which uses an electro-mechanical actuator to deliver impact energy to a supply of particles initially held on a sieve in a hopper. The impact energy causes a small number of particles to fall through the sieve and onto a weight measuring balance. The weight obtained is scrutinised by a processor to see if further actuations are required. In preferred embodiments, the energy of actuation is varied in accordance with the rate of dispensation calculated by the processor. Also, a correction amount can be obtained to take account of the fact that the balance can take a considerable amount of time to settle to its final value.

12 Claims, 16 Drawing Sheets

U.S. PATENT DOCUMENTS

| | | |
|---|---|---|
| 2,284,943 A | 6/1942 | Brace et al. |
| 2,300,605 A | 11/1942 | Wilcox |
| 2,412,840 A | 12/1946 | Snyder |
| 2,664,201 A | 12/1953 | Dunn |
| 2,676,733 A | 4/1954 | Lober |
| 3,212,683 A | 10/1965 | Santomieri |
| 3,224,649 A | 12/1965 | Gunto |
| 3,596,807 A | 8/1971 | Hudson et al. |
| 3,791,558 A | 2/1974 | Katusha |
| 3,865,278 A | 2/1975 | Gallati |
| 4,076,149 A | 2/1978 | Saxinger |
| 4,182,383 A | 1/1980 | Adomitis et al. |
| 4,223,751 A * | 9/1980 | Ayers et al. ............. 177/210 C |
| 4,366,872 A | 1/1983 | Brunnschweiler et al. |
| 4,529,050 A | 7/1985 | Mosher et al. |
| RE32,058 E | 12/1985 | Brunnschweiler et al. |
| 4,588,091 A | 5/1986 | Wade |
| 4,619,336 A | 10/1986 | Boyer et al. |
| 4,684,041 A | 8/1987 | Jones et al. |
| 4,762,252 A | 8/1988 | Hyer et al. |
| 4,945,957 A | 8/1990 | Kardux et al. |
| 4,974,646 A | 12/1990 | Martin et al. |
| 5,135,113 A * | 8/1992 | Mayer et al. ................. 209/539 |
| 5,145,009 A | 9/1992 | Mheidle et al. |
| 5,285,930 A | 2/1994 | Nielsen |
| 5,544,683 A | 8/1996 | Guhl |
| 5,568,881 A | 10/1996 | Chi |
| 5,602,485 A * | 2/1997 | Mayer et al. ................. 324/663 |
| 5,767,455 A * | 6/1998 | Mosher ....................... 177/64 |
| 5,780,779 A | 7/1998 | Kitamura et al. |
| 5,785,761 A | 7/1998 | Suzuki et al. |
| 5,855,232 A | 1/1999 | Ida et al. |
| 5,906,294 A * | 5/1999 | Ikeya et al. ................... 222/55 |
| 6,111,206 A | 8/2000 | Maguire |
| 7,086,569 B2 | 8/2006 | Stravitz |
| 2004/0238561 A1 | 12/2004 | MacMichael et al. |
| 2005/0040185 A1 | 2/2005 | MacMichael et al. |
| 2009/0294469 A1 * | 12/2009 | Poulain et al. ................. 222/1 |

FOREIGN PATENT DOCUMENTS

| | | |
|---|---|---|
| DE | 4345256 A1 | 12/1993 |
| DE | 19712625 | 10/1998 |
| EP | 0166562 A2 | 6/1984 |
| EP | 0353197 B1 | 5/1992 |
| FR | 2068008 | 11/1969 |
| FR | 2651320 | 3/1991 |
| GB | 986559 | 3/1965 |
| GB | 2027913 A | 2/1990 |
| GB | 2284901 A | 6/1995 |
| JP | 57-060222 | 4/1982 |
| JP | 7299816 | 11/1995 |
| JP | 8168747 | 7/1996 |
| JP | 09156760 | 6/1997 |
| JP | 10141642 | 5/1998 |

OTHER PUBLICATIONS

International Search Report for the corresponding international application No. PCT/GB00/04220, dated Feb. 1, 2001. (3 pgs.).

* cited by examiner

APPARATUS AND METHOD FOR DISPENSING SMALL QUANTITIES OF PARTICLES

CROSS-REFERENCES

This application is a continuation of U.S. patent application Ser. No. 11/112,545 filed Apr. 21, 2005 which is a continuation of U.S. patent application Ser. No. 10/129,463 filed Dec. 3, 2002 (now U.S. Pat. No. 6,987,228 issued Jan. 17, 2006) which is a 371 National Phase application of International Application Serial No. PCT/GB00/04220; filed Nov. 3, 2000 which claims priority to United Kingdom Application Serial No. 9926335.2 filed Nov. 5, 1999 which are incorporated herein by reference in their entirety and to which applications we claim priority under 35 USC §§119 and 120.

The present invention relates to devices and methods for dispensing particles by mass, in particular, devices which are capable of dispensing very small amounts (typically less than 5 mg of particles) accurately and reproducibly. The device can also be used to dispense greater weights accurately, e.g. 100 mg.

This invention is applicable to many types of particle dispensation. Particularly, this invention is applicable to pharmaceutical particle dispensing applications such as the filling, with a predetermined dose of particles, of dry powder inhalers, of capsules and of drug cassettes for use in gas propelled injection systems.

In U.S. Pat. No. 5,630,796, a method and device for accelerating drug particles through the skin, mucosal surfaces and other layers was described. This device causes small particles to be entrained in a very high speed gas, accelerating them with sufficient force to penetrate the skin. The particles may constitute powdered drug compounds and compositions or genetic material which may be attached to carrier particles (such as gold). Prior to actuation of the device, the particles are retained between two rupturable diaphragms. When the device is actuated and the gas in the gas reservoir is released, the diaphragms rupture and the particles are entrained in the gas flow. Preferably, the two rupturable diaphragms are constituted in the form of a removable and self-contained drug cassette. This allows the same device to be used more than once by simply replacing the cassette each time the device is used. It also allows the device to be supplied separately to the particles with the choice of which particle to accelerate being made after manufacturing.

For some applications, the quantity of particles initially contained in the cassette is required to be tightly controlled. Whilst some drugs, such as Lidocaine are not very dose specific, other drugs such as insulin are required to be administered in precisely controlled doses. Also, some drugs are extremely potent in their pure form meaning that very small amounts should be used. Whilst this potency can be reduced by changing the formulation of the drug, this results in an increase in overall expense since an extra formulation step where the pure drug is mixed with an excipient is required. Further, formulation difficulties can lead to an undesirable delay in bringing the drug product to the market.

Also, some drugs and vaccines are very expensive meaning that the minimum amount to give the required effect should be used for economic reasons. For example, DNA coated gold particles are expensive and some therapeutic compounds can cost tens of thousands of dollars per gram.

As can be imagined, it is often essential that cassettes are accurately and reproducibly loaded with known quantities of particles for safety reasons. An overdose of some drugs may have disastrous consequences whereas an underdose may result in the therapeutic agent not having the desired effect with equally undesirable consequences.

Furthermore, it is advantageous if cassettes are dosed quickly so that a large throughput of loaded cassettes may be produced in a given time. It is further preferred that any apparatus used meets the requirements of cleanliness associated with pharmaceutical production.

With all this in mind, the present invention addresses the problem that it has traditionally been very difficult to dose very small quantities of particles in an accurate and repeatable way, and without undue wastage. Also, previous dosing methods have not been very tolerant to inhomogeneity in the formulation, shape and size of the particles being used. Pharmaceuticals have conventionally been dosed using volumetric methods, which require precise control of process parameters when it is required to dose a specific mass of particles.

There are several methods known which might be used to dose small quantities of particles.

Firstly, a vacuum method is known which will be described with reference to FIG. 1. Here, a small capillary tube 11 having a plunger 12 of known swept volume is placed in a supply of particles 13 with the plunger fully extended, i.e. flush with the end of the capillary tube—see FIG. 1a. The plunger is then retracted a certain distance (see FIG. 1b) and the particles are sucked into the space left by the plunger in the capillary tube (see FIG. 1c). Later, the plunger is extended to push the particles from the capillary tube into the cassette or other receptacle to be filled—see FIG. 1d. This method suffers from the disadvantage that although the volume of particles obtained may be quite well controlled, the actual mass of particles is dependant on the density at the time and air pockets and other anomalies may reduce the total mass delivered. Further, the pushing action of the plunger imparts forces on the particles which may damage them, especially if they are fragile drug particles. This method suffers from the further problem that free flowing drug particles are required for accurate dosing. Thus, a drug particle formulation must be developed which results in a free flowing powder. If the powder is not free flowing, inaccurate dosing can occur.

A second method (not shown) involves the application of electrostatic printing technology to particle dispensation, i.e. using electrostatically charged particles which are manipulated by means of electric fields. This method suffers from the disadvantage that the particles must be electrostatically charged (which may be undesirable) and that the electronic circuitry required to manipulate the correct number of particles onto a surface or into a container is complicated and expensive. Also, it is very difficult to control the electrostatic fields so that they are not adversely influenced by outside interference. A further problem is that it is necessary to charge the particles consistently and so changes in particle shape and size must be avoided. Differences in particle size have a drastic effect on the relative particle charge achievable. This creates an added formulation burden.

A third method, shown in FIG. 2, known as "doctoring" involves compacting particles into a receptacle of known volume (see FIG. 2a) and then using a knife or other sharp blade to remove any excess particles lying above the top edges of the receptacle—see FIGS. 2b and 2c. As can be seen, a receptacle 21 is packed with particles 22 until it overflows. A blade 23 is used to remove the excess particles, above the top edge of the receptacle 21, leaving a standard volume of particles 24. This method is undesirable because it places severe forces on the particles, not only during the compaction process but also when the blade is used to shear off the top layer of particles. This method also suffers from the problem that a lot of effort must be put into the formulation of the drug particles so that they are free flowing and homogeneous. Also, this method is not really suitable for small scale applications where less than 5 mg of particles are required to be dispensed accurately.

The present invention is an alternative to the above-mentioned techniques. It has been found to accurately dispense small numbers of particles in a repeatable way, with very little particle wastage. Also, the method does not require undue effort to be put into the formulation of the drug particles. Virtually any particle, regardless of composition, and of any shape and size, can be dosed according to the present invention. Thus, the conventional effort put into obtaining a homogeneous and free flowing formulation of drug particles is obviated. In other words, the present invention allows pure or poorly formulated drug particles to be dosed accurately.

According to a first aspect of the present invention, there is provided apparatus for dispensing particles, comprising:

a particle retainer for retaining a supply of the particles to be dispensed, said particle retainer having a plurality of apertures for dispensing therethrough of said particles;

a particle release actuator for causing, in response to an actuation signal, some of said supply of particles to be dispensed from said particle retainer through said apertures; and a weight measuring device for measuring the apparent weight of particles dispensed from said particle retainer and for outputting a signal representing the measured apparent weight.

The plurality of apertures serves to retain the particles, even though the apertures have an average size larger than the average particle size. When the particle retainer is mechanically agitated by the particle release actuator, the particles are dislodged and pass through the apertures. The apertures are small enough so that they become "clogged" with particles in the steady state and there are a sufficient amount to ensure an acceptable number of particles are dispensed after each actuation. The equipment therefore provides an accurate and repeatable dispensing mechanism capable of dispensing very small numbers of particles.

The speed of operation can be improved by adding a correction value to the measured apparent weight to account for the effects of non-instantaneous working of the weight measuring device.

Accordingly, a second aspect of the present invention provides apparatus for dispensing particles, comprising:

a particle retainer for retaining a supply of the particles to be dispensed;

a particle release actuator for causing, in response to an actuation signal, some of said supply of particles to be dispensed from said particle retainer;

a weight measuring device for measuring the apparent weight of particles dispensed from said particle retainer and for outputting a signal representing the measured apparent weight; and a processor operatively connected to said particle release actuator and arranged to output said actuation signal thereto and operatively connected to said weight measuring device and arranged to receive said measured apparent weight signal therefrom, said processor being arranged to estimate the actual weight of particles dispensed by adding a correction value to said measured apparent weight.

The first aspect of the invention, like the second aspect, may utilise a processor which supplies an output actuation signal to the particle release actuator and receives a measured apparent weight signal from the weight measuring device. A number of preferable features are associated with both the first and second aspects of the present invention. Accordingly, the processor of both the first and second aspects may be arranged to provide an actuation signal that has a characteristic corresponding to the amount of particles desired to be dispensed from the particle retainer. Thus, the number of particles dispensed after each actuation of the particle release actuator may be controlled by modulating the signal fed to the particle release actuator. This modulation may take the form of varying the amplitude, frequency or pulse width of a signal for example.

The apparatus of the first or second embodiments may also be arranged to calculate the apparent rate at which particles are being dispensed onto the weight measuring device. This apparent rate may be used to calculate a correction for estimating the actual weight of particles on the weight measuring device at any particular time or additionally (or alternatively) it may be used to control the energy of actuation such that a target dispense rate is achieved.

The processor of both the first and second aspects may calculate the correction value by incrementing the correction value by a stored standard weight value for each time that the particle release actuator is actuated within a defined time period. Thus, an actual weight value may be estimated which takes account of recent actuations that have not been fully registered by the weight measuring device. For example, if the weight measuring device is modelled as having a delay of one second, the correction value is incremented by the stored standard weight value for every actuation that occurred within the last second. Preferably, the stored standard weight values are multiplied by a multiplication factor and the correction value is incremented by a multiplied standard weight, the amount of multiplication generally reducing in respect of actuations more distant in the past.

The value used as the stored standard weight increment can be updated after each complete dispense cycle by calculating the average actual mass delivered per actuation during the last dispense cycle.

During a dispense cycle, the processor can be arranged to compare either the measured apparent weight or the estimated actual dispensed weight with a pre-determined weight of particles so as to decide whether further dispensation of particles is necessary or whether the cycle can be stopped, the correct mass of particles having been dispensed. The pre-determined weight of particles is preferably represented as the desired weight of particles to be dispensed minus a tolerance weight. This reduces the likelihood of overfilling.

The apparatus of the first or second aspects may be arranged to track a target dispense rate by increasing or decreasing the energy of actuation when the measured dispense rate is lower or higher than a pre-determined desired rate value respectively. Alternatively, the rate of dispensing may be reduced by pausing for a pre-determined period of time after actuating so that the time between taking weight measurements is increased, resulting in a decrease in the observed dispense rate.

It is preferable to initially use a relatively high target dispense rate and then change to a relatively lower target dispense rate as the desired weight of particles is approached. This reduces the likelihood of overshooting the desired weight of particles.

A preferable construction of the apparatus according to both the first and second aspects of the invention utilises a hopper having apertures which are provided by a sieve across the cross-section of the hopper. For pharmaceutical applications, both the hopper and sieve are preferably made of 316 stainless steel, although a one piece plastics configuration is also useful.

The apertures are preferably holes having a diameter (or other relevant dimension) of from 50 to 800 μm, more preferably 80 to 400 µm, even more preferably 100 to 250 µm or more preferably still 180 to 250 µm.

The particle release actuator is preferably an electro-mechanical actuator such as an solenoid which is arranged to deliver a substantially horizontal impact energy to the side of the particle retainer. This is preferable to delivering impact energy to the top of the retainer since access to the retainer is not hindered and tapping the side of the container is found to provide more consistent results than tapping the top.

To protect against airflows or pressure differences, an enclosure is preferably provided for covering at least the weight measuring device and the particle retainer, and possibly also the particle release actuator.

Conventional vibration techniques suffer from the problem that they are difficult to control because the particle dispense rate is not linearly related to the frequency or amplitude of vibration. Once the particles are flowing, a flow limit is established beyond which higher dispense rates are difficult to achieve with precision. The present invention overcomes this by providing that the particles do not flow so as to reach the flow limit. The use of a particle release actuator means that a substantially discrete impulse of force can be applied to the particle retainer so that particles are dislodged momentarily. This method of dispensing can be used to provide very accurate dispensing down to very low weights and is also more controllable than continuous vibration techniques because the mass of particles dispensed after each actuation is more linearly related to the force of actuation.

The present invention also has the advantage that there are no relatively moving parts associated with those parts in contact with the particles. Previous techniques have used pins or screws which move to regulate particle flow. These can trap particles causing damage. The present invention also avoids the problem of mechanical damage which can occur when parts which move relative to one another are used and is easier to clean and maintain.

According to a third aspect of the present invention, there is provided a method of accurately dispensing particles, comprising the steps of:

retaining a supply of particles to be dispensed;

causing some of said supply of particles to be dispensed through a plurality of apertures from their retained position to a position where their weight can be measured;

measuring the apparent weight of said dispensed particles; and utilising said measured apparent weight to control particle dispensation.

The method of the third aspect of the invention allows accurate and repeatable dispensing of a small number of particles. Further accuracy can be obtained by estimating the actual weight of particles dispensed by adding a correction value to the measured apparent weight. This alleviates the effects of delays in obtaining a correct weight measurement, which are primarily due to delays originating from the weight measuring device, but also from the electronics and due to the time it takes for the particles to fall from the particle retainer to the cassette.

According to a fourth aspect of the present invention, there is provided a method of accurately dispensing particles, comprising the steps of:

retaining a supply of particles to be dispensed;

causing some of said supply of particles to be dispensed from their retained position to a position where their weight can be measured;

measuring the apparent weight of said dispensed particles;

estimating the actual weight of particles dispensed by adding said measured apparent weight to a correction value to thereby reduce the effects of delays in obtaining a correct weight measurement; and utilising said measured apparent weight to control particle dispensation.

The method of the fourth aspect may be carried out using the apparatus of either the first or second embodiments. Thus, each of the particles may be dispensed through one of a plurality of apertures formed in the particle retainer.

A number of preferable method steps may be carried out in conjunction with the methods of either the third or fourth aspect of the invention:

Closed loop control may be obtained by providing that the method steps are cyclically repeated until a pre-determined desired weight of particles has been dispensed within a pre-determined tolerance. This mitigates against the fact that a different mass of particles may be dispensed following each actuation of the particle release actuator.

The apparent rate at which particles are dispensed is preferably calculated. This value may be used either to obtain a correction to the measured apparent weight or to provide feedback in a control loop which controls the rate of particle dispensing (or both).

The correction value used to correct the measured apparent weight can be the calculated apparent rate which is preferably multiplied by a time constant. Alternatively, the correction value may be obtained by adding a stored standard weight for each time that the actuator is actuated during a just elapsed time period of some defined length. Each stored standard weight value used is preferably normalised by multiplying it by a multiplication factor which ranges between 0 and 1. This accounts for the observation that more correcting needs to be carried out if the actuator was actuated very recently rather than a relatively long time ago. No correction needs to be made in respect of actuations made a relatively long time in the past, since the weight measuring device and other apparatus will have responded fully to these such actuations.

After each dispense cycle, the standard weight value is preferably updated so as to more closely correspond to the average weight of particles that was delivered in each actuation during the previous dispense cycle.

Closed loop control may be provided by comparing either the measured apparent weight or the estimated actual weight of dispensed particles with a pre-determined stored weight and providing a further actuation-weighing cycle if the weight falls short of the pre-determined stored weight. The pre-determined stored weight is preferably a desired weight of particles to be dispensed minus a tolerance weight.

Dispense rate control may be carried out by causing more or less particles to be dispensed than were dispensed in the previous actuation-weigh cycle if the calculated apparent dispense rate is less or more than a pre-determined desired rate respectively. Alternatively (or additionally), the actual dispense rate can be reduced by halting the cycle for a pre-determined or variable period of time. The target dispense rate can be controlled having regard to the proximity of the measured apparent weight or estimated actual weight to the desired particle weight.

According to a fifth aspect of the present invention, there is provided a particle retainer intended for use in the apparatus of the first or second aspect or a particle retainer for retaining a supply of particles for use in the method of the third or fourth aspect, said particle retainer comprising:

a hopper;

a sieve across the cross-section of the hopper.

Preferably, the sieve is disposed at the end of the hopper and both are formed of 316 stainless steel. Alternatively, the sieve and hopper may be formed of plastics material or an electroformed mesh and glass tube respectively.

The sieve apertures are of a size such that they become clogged with the particle to be dispensed in a steady state but are readily unclogged for a brief period of time upon the application of external energy to the hopper (which is preferably an elongate duct).

According to a sixth aspect of the present invention, there is provided a processor intended for use as the processor in the apparatus of the first or second aspect, or for carrying out some of the method steps of the third or fourth aspect, said processor comprising:

signal output means for outputting an output signal of predetermined characteristic to a particle release actuator;

comparison means;

signal input means for supplying the value of an input signal derived from a signal output from a weight measuring device to said comparison means; and memory means for feeding a predetermined weight value stored therein to said comparison means;

said comparison means being arranged to compare said input signal value to the predetermined weight value and to determine whether said input signal is greater than said predetermined weight value.

The processor is preferably a personal computer connectable to a weight measuring device and particle release actuator. The personal computer is programmed to carry out the appropriate calculations in software. In particular, the processor may be programmed to add a correction value to the signal received from the weight measuring device so as to calculate an estimate of the actual weight of dispensed particles. In fact, the processor may, in general, be programmed so as to carry out the various calculations described in relation to the methods of the third and fourth aspects of the invention described above.

According to a seventh aspect of the invention, there is provided a manufacturing station for manufacturing a particle cassette comprising:

a collector for collecting an open and empty cassette;

a transporter for moving said open and empty cassette to a position at which its weight can be measured;

an apparatus according to the first or second aspect of the invention for dispensing particles into said open cassette;

The manufacturing station preferably further comprises a cassette closure station which closes a loaded cassette to contain the dispensed particles and a second transporter for moving the loaded cassettes to the cassette closure station. The transporter for performing this movement is preferably the same transporter as is used to move the open and empty cassette. Such a transporter may take the form of a pivotally mounted arm having a locator for locating the cassette at one end, or of a rotable circular component having such a locator positioned on its circumference. This locator is advantageously operable to grip and release the cassettes. This provides for automatic cassette filling and closure with minimum human input required.

The cassettes may be fed in on an in-feed track and fed out on an out-feed track. This provides that a "queue" of cassettes may be provided on the in-feed track such that a machine for manufacturing cassette bodies can be provided in series with the manufacturing station so as to simply deposit cassettes on an appropriate in-feed track for subsequent filling.

According to a eighth aspect of the present invention, there is further provided a production line comprising:

a plurality of manufacturing stations according to the seventh aspect of the present invention;

an in-feed track for feeding in open and empty cassettes; and an out-feed track for feeding out closed and loaded cassettes;

wherein said plurality of respective means for moving said cassettes are operable to take open and empty cassettes from said in-feed track and to place closed and loaded cassettes onto said out-feed track.

According to a ninth aspect of the present invention, there is provided a particle dispensing station comprising:

a plurality of apparatuses according to the first or second aspect of the invention; and a batch hopper movable between each particle retainer of each respective apparatus for refilling each said particle retainer with particles.

According to an tenth aspect of the invention, there is provided a method of estimating an actual weight of particles dispensed onto a weight measuring device having a non-instantaneous reaction time, the method comprising:

obtaining a measured apparent weight; and adding a correction value to said measured apparent weight, said correction value being derived either from a value representing the rate of change of said measured apparent weight or a value obtained by summing weighted amounts of a value representing the average weight dispensed in one actuation.

The method of the tenth aspect is preferably carried out in software on a computer and is designed to allow an accurate calculation of the actual weight of particles dispensed, even when an accurate weight is not available from a balance measuring the particle weight. This significantly speeds up a particle dispensing cycle in which particles are dispensed by performing a number of discrete actuations.

According to an eleventh aspect of the invention, there is provided an estimation function for use with the apparatus of the first or second aspect, the method of the third or fourth aspect or the processor of the sixth aspect having the form:

$$W_R = W(t) + C$$

where $W_R$ is the estimated actual weight, $W(t)$ is the current apparent weight and C is a correction value, wherein C has either of these two forms:

$$C = T \frac{dW}{dt}(t)$$

or $$C = \sum_{t=now-t_p}^{t=now} M(t) \cdot W_{ST}$$

where $dW/dt(t)$ is the current apparent rate of change of weight with time, T is a time constant, now represents the present time, now-$t_p$ represents a time $t_p$ ago, $M(t)$ is a multiplication factor and $W_{ST}$ is a standard weight value.

The present invention will be further described by way of non-limitative example with reference to the accompanying drawings, in which:—

APPARATUS OVERVIEW

Figure 1A:
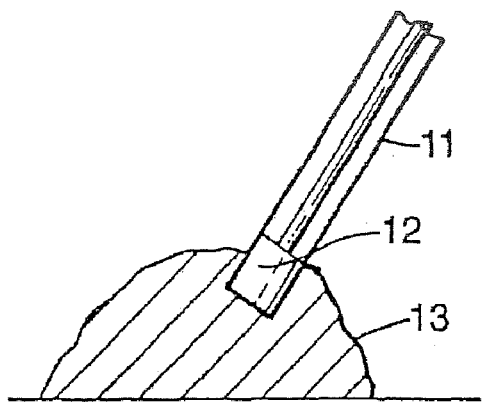
FIGS. 1A-1D are schematic cross-sectional side elevation views illustrating a way of dosing particles according to a prior art vacuum method.
Figure 1B:
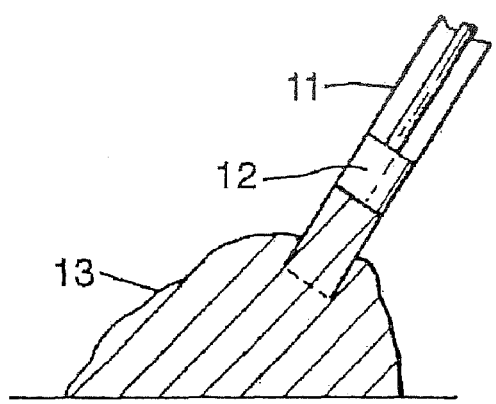
Figure 1C:
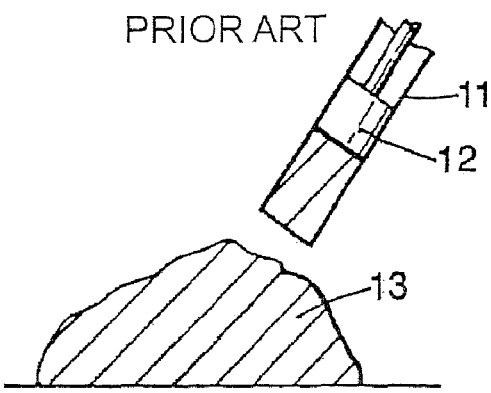
Figure 1D:
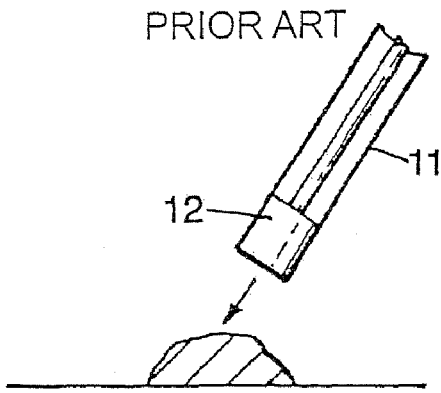
Figure 2A:
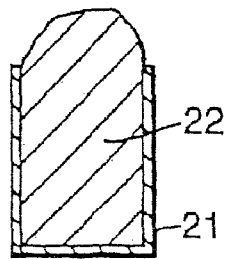
FIGS. 2A-2C are schematic cross-sectional side elevation views showing a prior art method of dosing particles known as "doctoring"
Figure 2B:
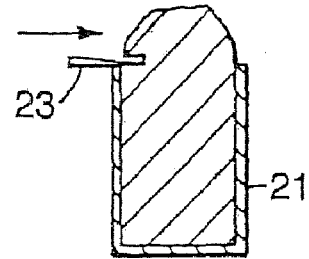
Figure 2C:
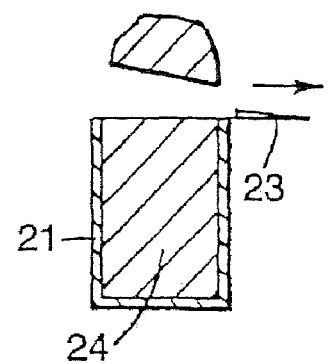
Figure 3:
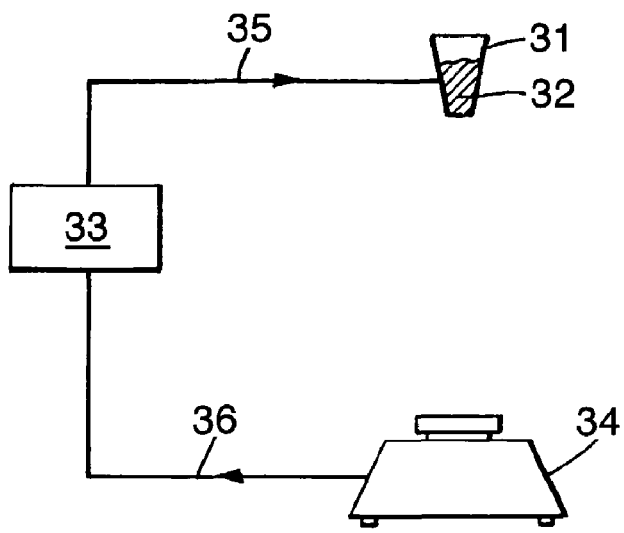
FIG. 3 is a schematic partially cut away side elevation of apparatus which illustrates the general concept of the present invention.

An overview of the apparatus according to the invention is shown in FIG. 3. As can be seen in this Figure, the apparatus has three main components. The first is a particle retainer 31 which serves to retain the particles 32 within its confines. The particle retainer is operatively linked to a control means 33 which is able to send signals 35 that cause the particle retainer to release some of the particles. The control means is also operatively linked to a weight measuring device 34. The weight measuring device is constituted so as to receive particles which are released from the particle retainer 31 and to measure their accumulated weight. This weight measurement is passed to the control means 33 as a signal 36.

Figure 4:
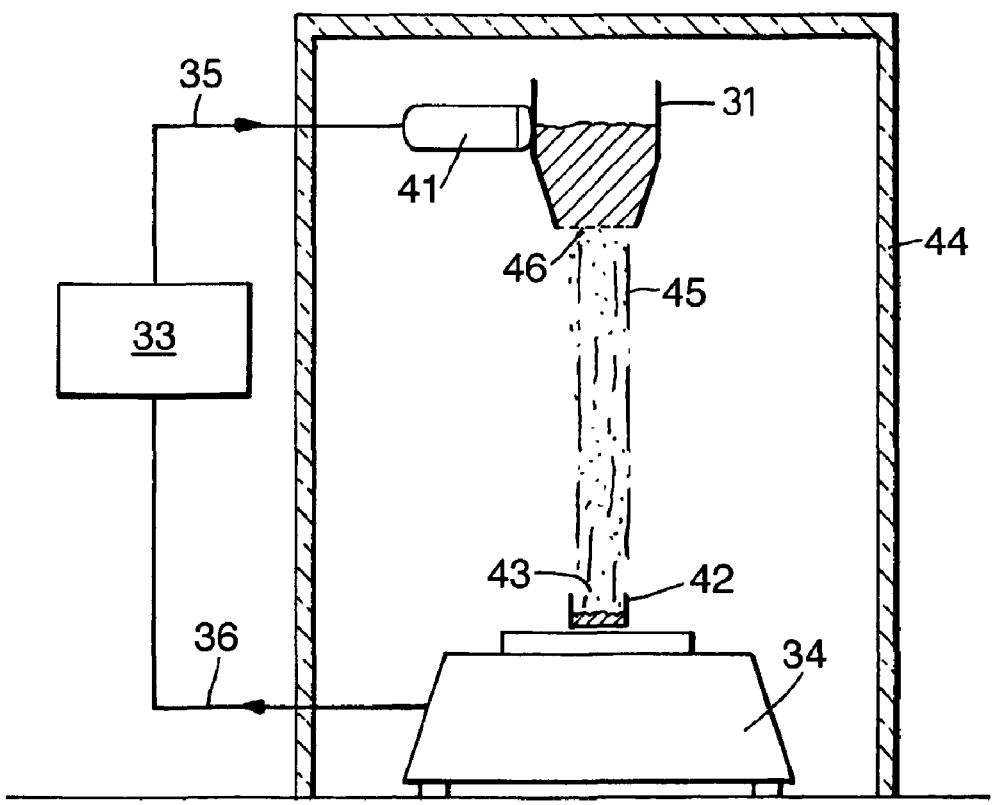
FIG. 4 shows schematically, in partially cut away side elevation and in a simple form, an apparatus according to the present invention.

A preferred apparatus is shown in more detail in FIG. 4. The particle retainer 31 is, as shown, constituted by a substantially frusto-conical hopper having a small diameter at its base (preferably 1-3 mm, but could be up to 10 mm). At the lower end of the hopper is a sieve 46, which may be an electro-formed mesh having holes of the order of 130 μm. The hole size is chosen having regard to the nature of the particles to be dispensed. For example, 130 μm is the value appropriate for dispensing DNA coated gold particles, 250 μm is appropriate for Lidocaine particles (whose diameter is approximately 30 μm and Alprostadil requires a value of between 200 and 300 μm. The optimum hole size is typically obtained having regard to the particle size and to other factors such as the flowability of the powder formulation. An empirical trial and error can be used to fully optimise the hole size for a particular formulation. For pharmaceutical applications, the hopper and sieve are preferably each be made of 316 stainless steel and are additionally detachable from one another to aid in cleaning and disinfecting (if necessary) in-between changing batches. As a further alternative, a one-piece stainless steel or moulded plastics hopper and sieve could be used. When plastics are used, the hopper and sieve can be simply disposed of in-between batches. The diameter of the hopper itself can be any suitable figure and can be chosen having regard to the mass of particles to be dispensed. A suitable value for Lidocaine is 10 mm for example. The particles 32 are located in the hopper and, when the hopper is free from any external vibration, are able to sit stably in the hopper without falling through the mesh, even though the average particle size (nominal diameter) is smaller than the diameter or other relevant dimension of the apertures of the mesh. This is achieved because the sieve apertures are clogged by particles so as to physically retain them within the hopper while the apparatus is in the steady state. The clogging is localised around the sieve vicinity so that the clogging may be temporarily alleviated by the application to the hopper of an external vibration or other movement. The sieve is not clogged to the extent that the particles will not flow through the sieve even on the application of external energy. To ensure this, the hopper may be supplied with, or attached to, additional equipment which ensures that the particles remain substantially flowable. Such equipment to fluidise particles is standard in the art and so explanation here will be omitted. Another possibility is to treat the particles chemically to ensure their flowability. Any standard fluidisation technique may be used in practice.

The control means 33 is preferably comprised of an electronic processor, more preferably a personal computer programmed in a language such as Visual BASIC or C++. The processor is able to transmit a signal 35 to a particle release actuation means 41 which is preferably constituted by an electro-mechanical actuator such as a solenoid. The solenoid is shown in FIG. 4 as impacting the side of the hopper which has a substantially vertical outer surface and this is the preferred arrangement. An alternative arrangement whereby the actuator impacts the top of the hopper has been tried with success but has been found to have two disadvantages in terms of consistency of results (i.e. repeatability in the mass of particles dispensed in response to impacts of identical energy) and in terms of access to the hopper to refill it.

The processor 33 passes a signal 35 to the actuator 41 that has a characteristic which corresponds with the impact energy that the actuator will exert upon receipt of the signal. For example, the signal may have a higher magnitude to achieve a more energetic impact. Preferably, the signal is a square voltage pulse modulated by amplitude.

The weight measuring device 34 may be a standard balance used for measuring small quantities and may typically have a dynamic range of 60 g and an accuracy of 10 μg. For example a Mettler Toledo SAG285 (TM) balance is appropriate. More accurate balances (such as a Sartorius MC5 (TM)) may instead be used if the accuracy of the system as a whole is desired to be improved. Balances with a lower dynamic range, possibly specially made balances, may be used if the speed of the system as a whole is desired to be improved. The weight measuring device 34 supplies a signal 36 to the processor 33 that is a function of (e.g. is proportional to) the weight applied to the balance. The weight measured will typically be the sum of the weight of the particles 43 that have already been dispensed from the particle retainer and the weight of a cassette 42 which is placed on the balance 34 in a position where it is able to catch substantially all of the particles 45 leaving the particle retainer 31. FIG. 4 is shown in schematic form only and it is to be noted that in a practical embodiment, steps would be taken to ensure that no particles 45 are able to leave the sieve 46 and not fall into the cassette 42. This is generally achieved by positioning the sieve within the confines of the cassette cavity so that particles would have to have a component of movement vertically upward in order to escape from the cassette.

It is also to be noted that although the word "cassette" encompasses cassettes of the type mentioned in U.S. Pat. No. 5,630,796, it is intended that this word also encompasses any form of containment apparatus. For example, the word cassette also encompasses pockets, cartridges, blisters for dry powder inhalers, cartridges for drug delivery devices, capsules for oral delivery of drugs etc. In fact, the word cassette is intended to cover anything into which it is desirable to dispense particles. This may include a substrate made up of excipient onto which particles may be dispensed so that a further substrate can be placed on top to "sandwich" the dispensed particles between two substrates of excipient. The complete package can be used as a tablet for taking orally which would release the dispensed particles only when the excipient has been broken down in the patient's stomach. The word cassette is also intended to cover intermediate holding devices into which the particle dose is weighed before being transferred to the desired location. For example, the particles could be weighed into a cassette before being transferred (by tipping or any suitable method) into a blister, substrate or any other receptacle. This has the advantage of allowing particle transfer into a final unit which is significantly heavier than the dose of particles or which is too bulky to be weighed properly (e.g. a tape containing blisters). A further advantage of this arrangement is that it is compatible with a form of rapid weighing in which several (e.g. ten) cassettes are loaded simultaneously and a smaller number of these (e.g. three) are emptied into a final receptacle in a combination which gives the desired final weight.

An enclosure 44 is advantageously provided to cover the weight measuring device and particle retainer so that the system is not influenced by draughts or other environmental factors. The enclosure preferably at least covers the weight measuring device but may also (as is shown in FIG. 4) cover the actuating means 41 and the particle retainer 31.

Initially, the particle retainer 31 is loaded with a supply of particles 32 sufficient to fill at least one cassette 42. Preferably, the supply of particles 32 is enough to fill a plurality of the cassettes, e.g. seventy. The supply of particles 32 initially clogs the sieve 45 so that the particles near the sieve are in a position of unstable equilibrium. Any small perturbation of the hopper may serve to upset this condition of unstable equilibrium and cause some particles to fall through the sieve. When a certain number of particles have fallen, and in the absence of further perturbation, another position of unstable equilibrium is reached and the sieve again becomes clogged allowing the procedure to be repeated until the correct dose of particles has been dispensed.

In practice, perturbations to the particle retainer 31 are provided by the actuator 41 which in the apparatus of FIG. 4 serves to "tap" the particle retainer 31. This tapping is achieved typically using a square pulse of voltage of fixed width to drive the actuator.

In this embodiment, the actuator is a solenoid but in general it could be represented by any suitable device or system including motors, springs etc. This tap causes a small quantity of the particles to be released and to fall into the drug cassette 42 placed on the weight measuring device 34. This quantity tends to be proportional to the energy of tapping although there is some variation either side of the average. This can be a problem if an actuation of certain energy causes an unusually large quantity of particles to be dislodged but this problem can be ameliorated by providing very low energy tapping during the final stages of a dispense cycle so that even an unusually large quantity of dislodged particles for the expended energy does not increase the total weight of particles dispensed by more than twice the weight tolerance (the tolerance is defined as the weight either side of the desired amount, e.g. a tolerance of 10 μg means±10 μg either side of the required amount).

In general, a signal 36 from the weight measuring device representing the weight of the released particles and the weight of the drug cassette (although the weight measuring device may be calibrated (using a tare function) not to show the weight of the drug cassette and only to show the weight of the released particles) is supplied to the processor 33 which may perform further calculations using the obtained weight measurement. A comparison is then carried out to see if the weight of particles dispensed is greater than or equal to a predetermined value stored in a memory of the processor 33. This predetermined value is preferably a value representing the desired weight of particles to be dispensed minus the tolerance weight. If the weight of the dispensed particles is not greater than or equal to the predetermined value, insufficient particles have been dispensed and the processor 33 sends a signal to the actuator 41 to perform another tap on the particle retainer 31, thereby releasing another small amount of particles. Another weight check and comparison is then carried out. This cycle repeats until the desired particle weight has been reached or exceeded whereupon the process finishes.

The apparatus described may be used to perform closed loop control of the dispensed particle weight. The processor 31 makes decisions on whether or not to actuate the actuator 41 based on the signal 36 emanating from the weight measuring device 34. The processor may also control the amount of impact energy that the actuator 41 transmits to the particle retainer 31. In this way, an accurately dosed amount of particles can be dispensed to the cassette.

The apparatus of the present invention is particularly advantageous for dispensing small quantities of particles by mass. The amount to be dispensed would typically be less than 5 mg, and may preferably be in the following ranges (listed in order of decreasing preference): 0-4 mg; 0-3 mg; 0-2.5 mg; 0-2 mg; 0-1 mg; 0-0.5 mg. The above quoted ranges are not inclusive of the amount 0.

Exemplary embodiments of methods according to aspects of the present invention will now be described with reference to FIGS. 5 to 22. In general, these methods may be performed by the apparatus shown in FIG. 4 or 17 but are not limited thereto. Any suitable apparatus may be used in practice.

First Embodiment of the Method

Figure 5:
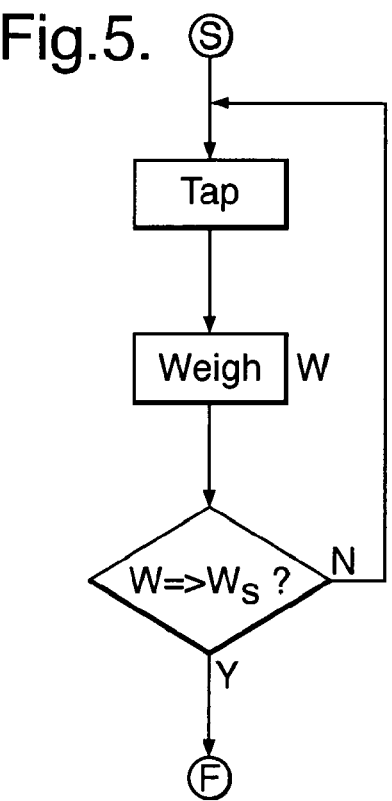
FIG. 5 is a flow diagram which exemplifies a first embodiment of a method according to the present invention.

A method of dosing particles according to first embodiment of the present invention is shown schematically by the flow diagram of FIG. 5.

This embodiment represents one of the simpler forms of the invention. Firstly, the processor 33 causes the actuator 41 to exert a controlled tap on the particle retainer 31. The magnitude of the tap may be controlled by varying a characteristic (such as the frequency or magnitude of voltage or pulse width of the signal for example) of signal 35 and the initial value used may be stored in a memory. The magnitude of the tap need not be varied however, with the actuator performing a standard tap against the particle retainer each time. The "tap" described herein may also consist of a series of taps of predetermined magnitude and duration or indeed may take the form of continuous or intermittent vibration. The tapping causes some of the particles in the particle retainer to become dislodged from their clogged position and to pass through the apertures in the mesh 46, landing on a cassette placed on the balance. The processor then checks the value of signal 36 to see what weight of particles was dispensed as a result of the tapping action. This weight W is then compared with a predetermined desired weight $W_s$ and a decision is made as to whether more taps are required. If more taps are required, the cycle repeats until the weight measured by the weight measuring device reaches an acceptable amount.

Typically, the predetermined weight value $W_s$ stored in the memory will be slightly less than the desired final weight by a value equal to the tolerance of the system. For example, if the weight it is desired to dispense is 500 μg and the tolerance is −10 μg, the predetermined value $W_s$ would be 490 μg. This is because the system only looks to see if the measured weight is equal to or greater than the predetermined weight. If the predetermined weight is the minimum possible, there is less risk of over-filling the cassette. The system does not allow under-filling (i.e. filling to less than the predetermined weight) since the cycle only stops when a predetermined value is met or exceeded.

In practice, the balance can be programmed to output sampled weight values to the processor at regular intervals, e.g. approximately every quarter of a second using a Mettler SAG285 balance or 10 times a second using a Sartorius MC5 balance. Up to 30 times a second is possible using a specially modified balance. After the processor has caused the actuator to tap the particle retainer, it will take a value available to it from a buffer of recent values obtained from the balance. It is not absolutely necessary that the value taken is the most recent weight value since in practice the weight can vary quite slowly compared to the sampling period meaning that all the values in the buffer (which may, for example, hold 4 values) are roughly similar. It is preferable that the value taken is the most recent measurement. In other words, the tapping of the particle retainer 31 and the outputting from the balance of the weight signal do not need to be carried out in synchronism for the invention to operate effectively.

This process and apparatus allows extremely accurate dosing of the particles because it can be arranged (by using a low actuation impact energy and a small number of apertures) that only a very small number of particles leave the hopper after each tap. For example, if only 10 μg of particles leave the hopper after each tap, then dosing can be achieved which is accurate to within 5 μg of the desired amount. The actual amount of particles that leave after each tap, however, may be 1 μg or even lower. This depends on the relative particle/sieve size as well as the energy of actuation.

Second Embodiment of the Method

Figure 6:
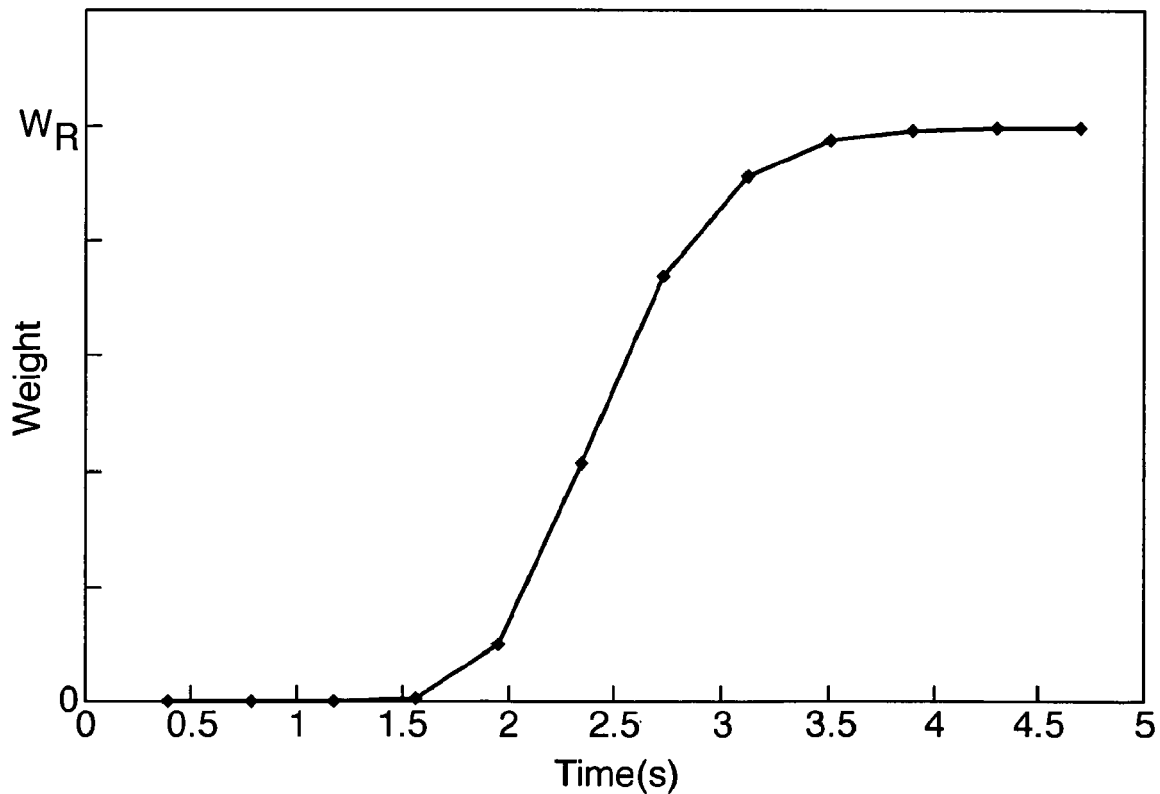
FIG. 6 shows a graph of how the signal outputted by a balance typically varies with time in response to the balance being instantaneously loaded with a weight $W_R$ particles.

It has been found in practice that when standard balances are used, a correct reading is not obtained instantaneously. Although the particles 45 fall from the particle retainer 31 very quickly and settle in the drug cassette 42 after a very short period of time (e.g. less than 0.25 seconds), it can take the balance a relatively longer amount of time to settle down to obtain the correct weight measurement. FIG. 6 shows the static impulse response of a Mettler SAG285 balance which is a typical curve of how the balance responds to a sudden increase in load applied at time t=0. The weight of particles applied (at t=0) to the balance is $W_R$. In response to this, the output measurement signal of the balance has a delay where nothing happens followed by an approximately exponential approach to the value $W_R$ resulting in an S-shaped curve. This S-shaped curve represents the measurement that the balance outputs and therefore also represents the apparent weight of particles on the balance at any time. This is the "measured apparent weight". It can therefore be seen that it can take many seconds for the measured apparent weight to reach the correct value. The exact shape of this curve depends on the design of the balance.

Figure 7:
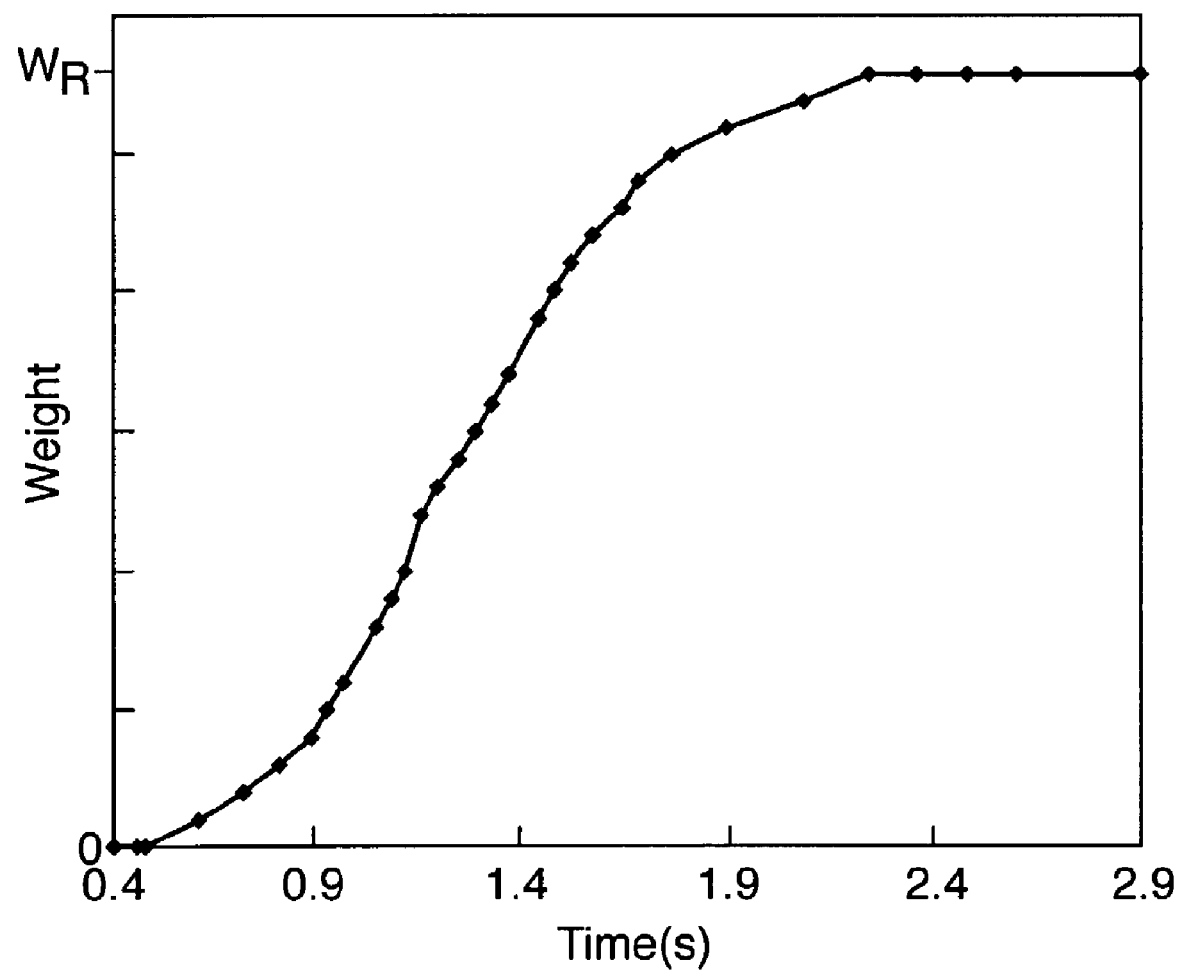
FIG. 7 shows a graph of how the signal outputted by a faster-acting balance typically varies with time in response to a balance being instantaneously loaded with a weight $W_R$ of particles at time t=0.

For example, (as shown in FIG. 6) the settling time of the Mettler balance is about 4 seconds (meaning that it reaches an accurate stable weight in 4 seconds). If a lot of taps are required, and it is necessary to wait for 4 seconds between each tap, then the time taken to fill a particle cassette becomes prohibitively large. This can be addressed to some extent by using a balance which settles to a stable weight in a smaller time. For example, the settling curve of a Sartorius MC5 balance is shown in FIG. 7 and it can be seen from this Figure that a stable weight is achieved in about 2.2 seconds. However, the problem of non-instantaneous response still exists and the improved method shown in FIG. 8 has been developed to ameliorate this.

Figure 8:
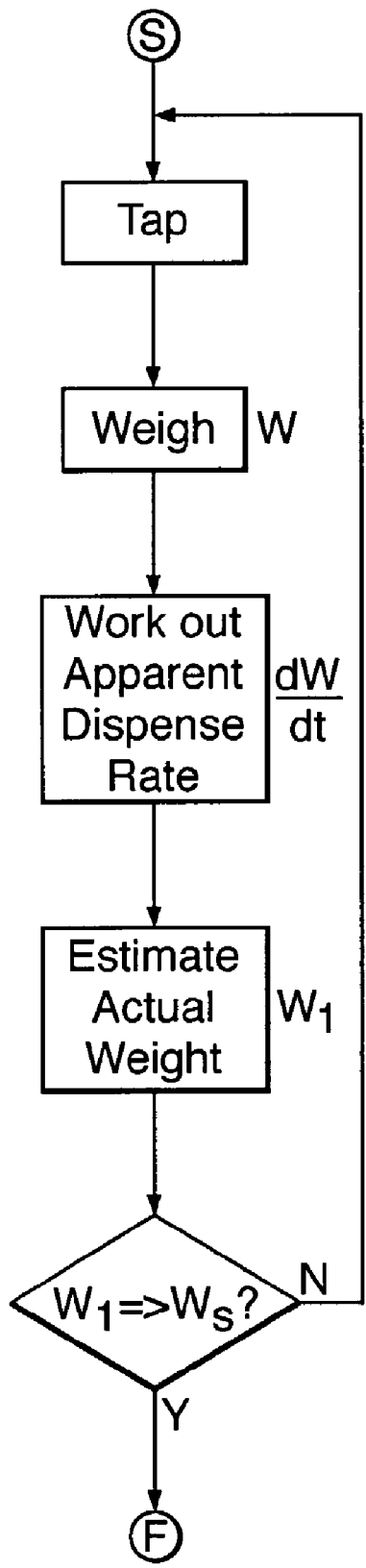
FIG. 8 is another flow diagram which exemplifies a second embodiment of a method according to the present invention.
Figure 9:
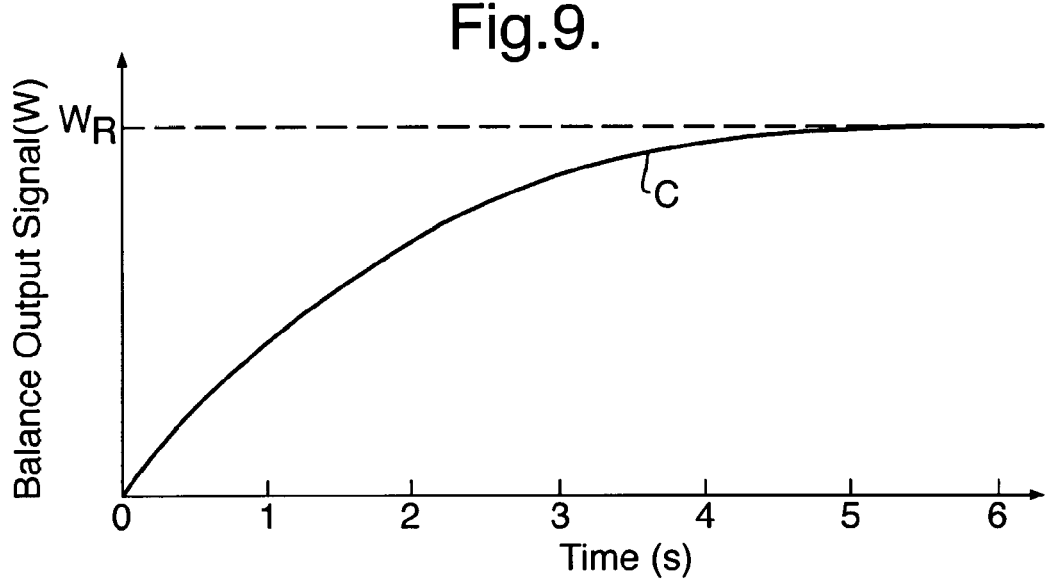
FIG. 9 is an idealised graph of how the signal outputted by a balance varies with time in response to the balance being instantaneously loaded with a mass of particles.

This embodiment is based on the observation that the later part of the curve of FIGS. 6 and 7 is approximated by a simple exponential curve C of the type shown in FIG. 9. The method of FIG. 8 is based on the approximation that the exponential curve C shown in FIG. 9 is a good approximation of the final part of the real curve shown in FIG. 6. The curve of FIG. 9 may be represented by the equation:

$$W = W_R(1 - e^{\frac{-t}{T}}) \quad (1)$$

where W is the instantaneous weight measurement, $W_R$ is the actual weight of particles dropped on the balance, T is a time constant associated with the balance and t is time. Differentiating this with respect to time yields:

$$\frac{dW}{dt} = \frac{W_R}{T} e^{\frac{-t}{T}} \qquad (2)$$

Substituting the $e^{-1}$ term from (2) to (1) gives:

$$W = W_R - T\frac{dW}{dt} \qquad (3)$$

Rearranging gives a value for $W_R$ based only on the absolute weight value W and gradient dW/dt at any point in time t:

$$W_R = W(t) + T\frac{dW}{dt}(t) \qquad (4)$$

Thus, the assumption of exponential characteristics makes it possible to predict the final value that the balance will reach from a knowledge only of the current value, the current gradient and the time constant T of the balance. The apparent rate of change of measured weight can be used to correct the measured weight to obtain a value closer to the actual weight.

The method of the second embodiment is similar to the method of the first embodiment except that two extra steps are provided after the initial weighing step as shown in FIG. 8. After a single actuation, the particles are nearly instantaneously deposited on the balance and the balance reacts by moving along the curve of FIG. 6 (or FIG. 7) to the actual weight value. The measured apparent weight signal is continuously monitored (by sampling at an appropriate rate, e.g. 30 times a second using a Sartorius balance) by the processor and the rate at which weight appears to increase (dW/dt) is calculated. dW/dt is therefore the apparent rate at which particles are being dispensed even though the actual weight of particles on the balance remains constant once they have been deposited on the balance. The apparent weight does not correspond to the actual rate at which particles are being dispensed since in reality, the particles are dispensed nearly instantaneously. The apparent weight measurement W and rate measurement dW/dt are then used to estimate what the final settled weight $W_R$ of the balance will be using equation (4) above. For example, if it is known that after one second the weight is a particular value and the gradient of the weight-time graph is a particular value, it is possible to determine what the weight after 4 seconds (when the balance has settled to its final value) will be.

It is this estimated final value that is then compared to the predetermined value stored in memory to see if the correct total mass of particles has been dispensed. If the correct amount has not yet been dispensed, the particle retainer 31 is tapped again and the process is repeated. Estimating the dispensed weight in this way allows much quicker operation of the device since it is no longer necessary to wait while the balance settles.

In practice, the apparent dispense rate is calculated using the weight values at two points 1 and 2 and the time between taking these weight measurements. It is therefore useful that the processor 33 stores in a memory values representing past weight measurements and values representing the time at which these measurements were taken. The rate of increase of weight dW/dt may then be calculated by calculating $(W_2-W_1)/(t_2-t_1)$. Alternatively, well-known analogue electronic methods may be used to differentiate the apparent weight-time curve.

The impulse response of the balance will not in all cases be a true exponential curve. To account for this, the value chosen for time constant T may be varied to provide the best fit.

The choice of coefficient T is preferably obtained empirically and it has been found that it is usually in the vicinity of one second, being in the range 0.5 to 2 s, or more preferably 0.8 to 1.2 s.

Figure 10:
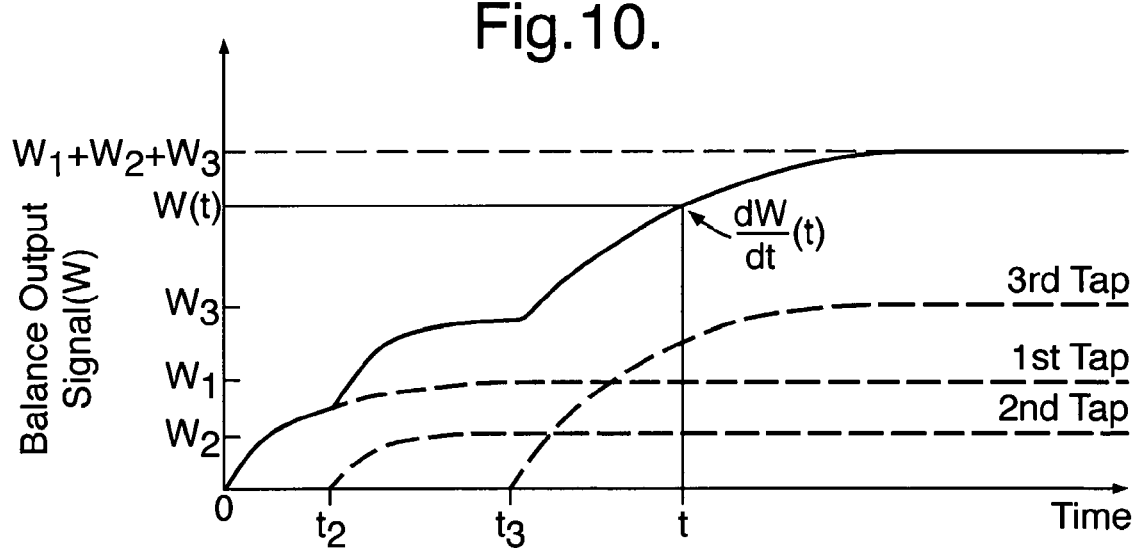
FIG. 10 is a further graph of how the signal outputted by the balance ideally varies with time as the balance is continuously loaded with discrete masses of particles.

During the execution of the method, the particle retainer 31 is tapped many times and the instantaneous weight measurement at any time will in general be made up of many small individual impulse responses distributed over time. It is to be understood that, in general, these responses will be of different magnitudes since the amount of particles hitting the balance after each tap is not precisely predictable or constant. A typical balance output signal is shown in FIG. 10. The dotted lines show the response of the balance to a bundle of particles hitting the balance after each tap. As a working approximation of linearity, the resulting signal (solid line) is a composite curve made up of the many smaller impulse responses.

Taking the general point t in FIG. 10 as an example, the weight measurement at this point is made up of the impulse responses due to three taps. The measured weight at point t is therefore:

$$W(t) = W_1\left(1 - e^{\frac{-t}{T}}\right) + W_2\left(1 - e^{\frac{-(t-t_2)}{T}}\right) + W_3\left(1 - e^{\frac{-(t-t_3)}{T}}\right) \qquad (5)$$

Where $t_2$ and $t_3$ are the points in time where the second and third impulse responses start and $W_1$, $W_2$ and $W_3$ are the final values of each individual impulse response. The gradient at point t is given by:

$$\frac{dW}{dt}(t) = \frac{W_1}{T}e^{\frac{-t}{T}} + \frac{W_2}{T}e^{\frac{-(t-t_2)}{T}} + \frac{W}{T_3}e^{\frac{-(t-t_3)}{T}} \qquad (6)$$

Making the appropriate substitutions leads to:

$$W_1 + W_2 + W_3 = W(t) + T\frac{dW}{dt}(t) \qquad (7)$$

This gives the final output $(W_1+W_2+W_3)$ solely in terms of the present measured value and the present gradient. In other words, equation (4) is still a good approximation even when more than one tap is affecting the currently measured values.

Third Embodiment of the Method

The third embodiment of the method provides an alternative way of calculating the correction value which can be added to the measured apparent weight so as to obtain a more accurate value for the actual weight of particles on the balance 34 at any one time. The method of the third embodiment has a number of advantages over the method described above in relation to the second embodiment. Firstly, the method is more empirical, and thus takes account of actually observed phenomena. Thus, the method takes more account of the fact that the actual settling curve of a balance is more S-shaped, rather than truly exponential. Secondly, erroneous results can be obtained when calculating the rate of change in the second embodiment because the actual settling curve is S-shaped, meaning that there are two positions having the same gradient. Thus, the same correction amount will be obtained at two positions and this amount will not be correct for both positions. The method of the third embodiment does not have this problem. Further, the method of the third embodiment allows the dispense cycle to be interrupted and restarted without any adverse effect. If the dispense cycle is interrupted when the method of the second embodiment is used, an anomalous value for the dispense rate is obtained which can result in inaccurate dispensing.

Figure 11:
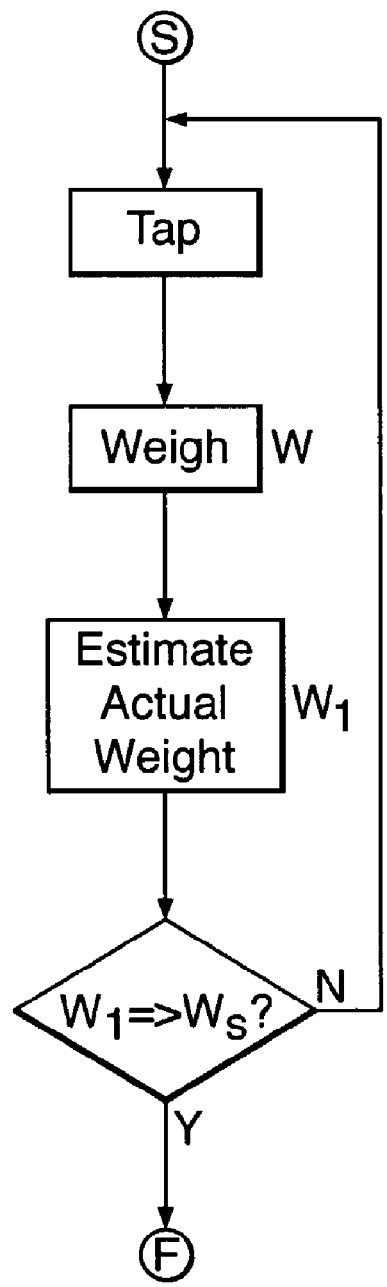
FIG. 11 shows a flow diagram exemplifying a method according to the third embodiment of the invention.

The flow chart for the third embodiment is shown in FIG. 11. As can be seen, the method is very similar to the method of FIG. 8 except that the apparent dispense rate is not required to work out the correction value.

Figure 12:
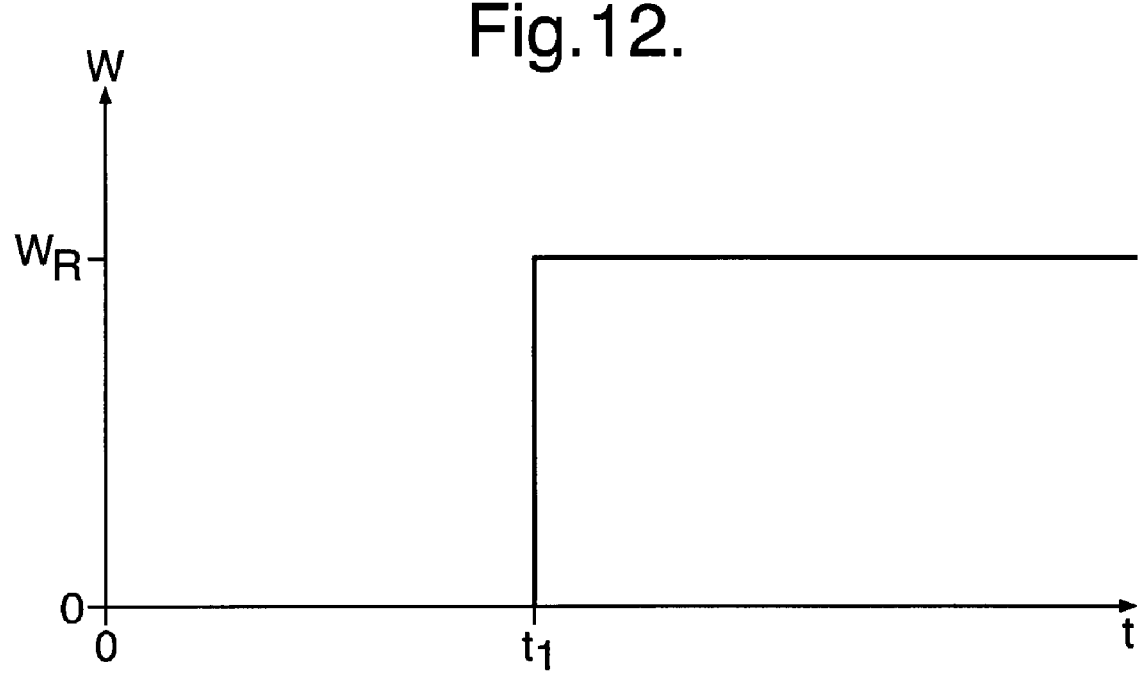
FIG. 12 shows a balance response idealised as a delay of $t_1$.

The third embodiment of the method provides that the correction added to the measured apparent weight is determined by the recent history of taps carried out. Thus, it is necessary that the apparatus used is capable of recording when in time the particle release actuator is actuated. In a simple form, the response of the balance could be modelled as a simple delay of time $t_1$. This response is shown in FIG. 12. As can be seen from FIG. 12, when a mass $W_R$ is applied to the balance, nothing happens to the output weight measurement until the time $t_1$, when the correct weight measurement is output. If the balance had such a characteristic, then the method of the third embodiment would provide that the correction value is equal to the weight $W_R$ multiplied by the number of actuations that occurred in the just elapsed period of time equal to $t_1$. Thus, if $t_1$ was equal to one second, and three actuations occurred in the last one second, then the correction value would be equal to $3W_R$. In this way, actuations which have occurred, but have not been registered are taken into account when calculating the actual weight of particles on the balance at any one time. The amount $W_R$ used in the correction calculation is a stored weight which is assumed to be the same weight that was dispensed by a single actuation. Of course, the actual weight dispensed as a result of any single actuation is unknown until it is measured. A small amount of error will therefore be introduced by assuming that every actuation is of a "standard" weight of particles.

The above calculation can be summarised by the following equation:

$$C = \sum_{t=now-t_p}^{t=now} W_{ST} \qquad (8)$$

Where C is the correction weight to be added to the measured apparent weight, now represents the present time, now-$t_p$ represents a time $t_p$ ago, and $W_{ST}$ is a standard weight value.

The correction value can therefore be seen to be the sum of each tap that occurred in the time period (now-$t_p$) to (now).

In reality, the balance settling curve is not a pure delay and actually has the form shown in FIG. 6 or 7 for example. To account for this, the "standard" tap weight mentioned above can be subjected to some scaling before it is included in the correction value calculation.

Figure 13:
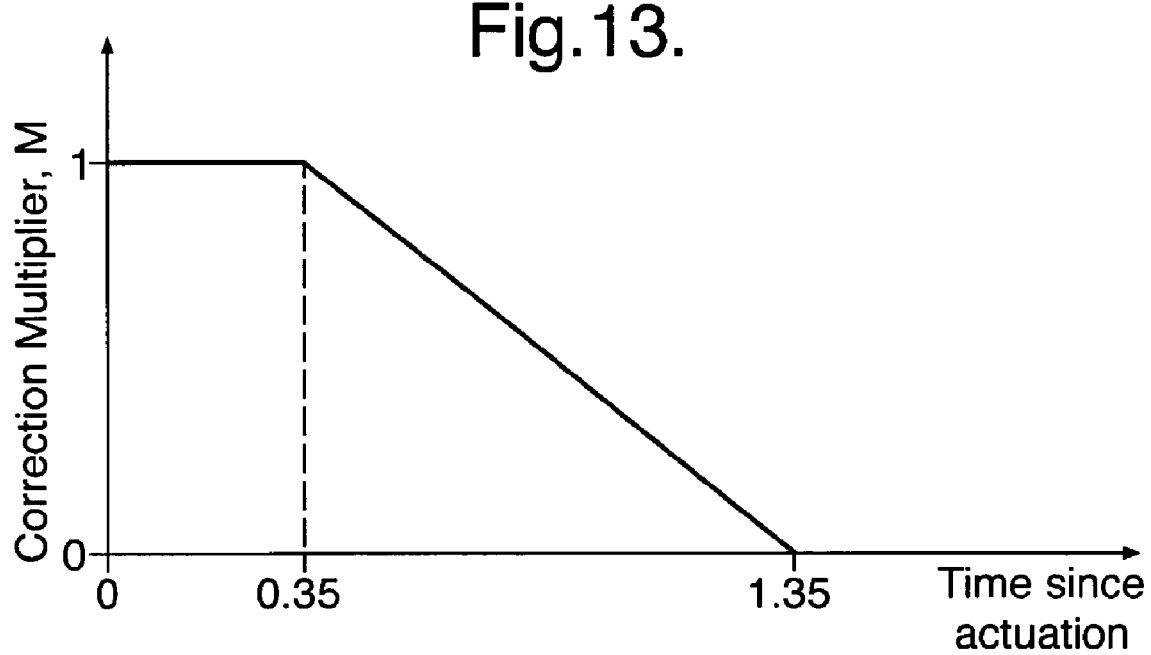
FIG. 13 shows a graph of how a correction multiplier varies according to a third embodiment of the method of the present invention.

As will be evident from FIG. 7, if the actuator has only just performed an actuation, substantially all of the standard weight $W_{ST}$ will need to be added as a correction because the balance will not have reacted to the actuation yet. However, for actuations more distant in the past, less of the standard weight needs to be added as a correction because the balance will have reacted to some degree to the actuation. As might be imagined then, a standard weight normalising function can be obtained by simply flipping the graph of FIG. 7 about a horizontal axis so as to obtain a graph of how big the correction value should be in respect of actuations made at different times in the past. A linear approximation to such a graph is shown in FIG. 13. Thus, to account for the S-shaped balance settling curve, a correction multiplier which ranges between 0 and 1 is defined. Each standard tap weight which is used to build up the correction value is firstly multiplied by the appropriate correction multiplier M. The value of the correction multiplier is found from the graph of FIG. 13. For example, if the actuator was actuated between 0 and 0.35 seconds ago, then the correction multiplier M is 1. This means that the standard tap weight $W_{ST}$ will be multiplied by 1 resulting in the whole of the standard tap weight $W_{ST}$ being added to the correction value in respect of actuations between 0 and 0.35 seconds ago. For actuations made between 0.35 and 1.35 seconds ago, the correction multiplier varies linearly between 1 and 0. Thus, an actuation which occurred 0.85 seconds ago would have associated with it a correction multiplier of 0.5 which would mean that half the standard tap weight would be added to the correction value in respect of this actuation. In this way, actuations which occurred more distantly in the past are given less waiting than actuations which have only just been carried out. This can be summarised by the following equation:

$$C = \sum_{t=now-t_p}^{t=now} M(t) \cdot W_{ST} \qquad (9)$$

M(t) is the multiplication factor graph of FIG. 13 for example.

This method does not suffer from the problem encountered when calculating the rate of change in the second embodiment when the dispense cycle is abruptly stopped and then started again. Also, the method does not suffer from the problem that there my be two parts of the settling curve having the same gradient but at different weights because the correction amount is determined purely by how long ago an actuation was and how many recent actuations there have been. It is not determined by the gradient of a graph which is unrobust and vulnerable to large changes resulting in large inaccuracies.

The method of the third embodiment requires that a "standard" weight is stored in memory and is used as an approximation to the actual weight of particles which are dispensed in any given tap. Changing environmental factors may dictate that the average actual weight of particles dispensed in the tap changes with time. To account for this, the stored "standard" weight can be updated at the end of a complete dispense cycle to account for such changes. This updating is carried out in the present embodiment by dividing the total weight dispensed in the last cycle by the total number of taps used to dispense this weight in the last cycle. Thus, if the last cycle delivered 500 µg in 50 taps then the stored "standard" weight would be set to 10 µg. This value would then be used when calculating the actual dispensed weight in the next dispense cycle.

It is to be noted that the correction multiplier graph shown in FIG. 13 is preferably optimised empirically since it will not always correspond to the static settling curve of a balance flipped about a horizontal axis. This is because the dynamic settling curve of a balance can vary from the measured static settling curve. That is to say, the settling time can actually be much less when the balance is being continuously loaded with particles than would be observed when the balance is at rest and is loaded with an impulse of particles and is left to settle. Thus, once the balance is in a dynamic reading state, the settling time is effectively reduced. This fact is represented in FIGS. 7 and 13 above where it can be noted that FIG. 13 shows that actuations more than 1.35 seconds earlier are not taken into account whereas the static curve of FIG. 7 indicates that an actuation 1.35 seconds ago would require a correction multiplier of about 0.4.

Fourth Embodiment of the Method

The fourth embodiment comprises an extra calculation and adjustment to the operation parameters which can be used in conjunction with any of the above described methods of dispensing.

It has been found that the number of particles released by particle retainer 31 bears a relation to the impact energy with which the particle retainer 31 is tapped by the actuator 41. Thus, tapping harder usually causes more particles to be released and tapping less hard usually causes fewer particles to be released. This fact can be advantageously used when particle dosing is required to a high accuracy but large doses compared to the tolerance needed are required. For example, if a dosing accuracy of 10 μg is required for a dose of 500 μg, then the method of FIG. 5 would require that approximately fifty 10 μg taps are carried out. This may take an undesirably long amount of time, even when the actual weight is estimated using a correction based on the measured dispense rate or sum of recent taps as described above in the second and third embodiments. Thus, the fourth embodiment provides an improved method whereby harder taps are carried out near the beginning of the dosing process and less forceful taps are carried out near the end (when high accuracy is required).

Figure 14:
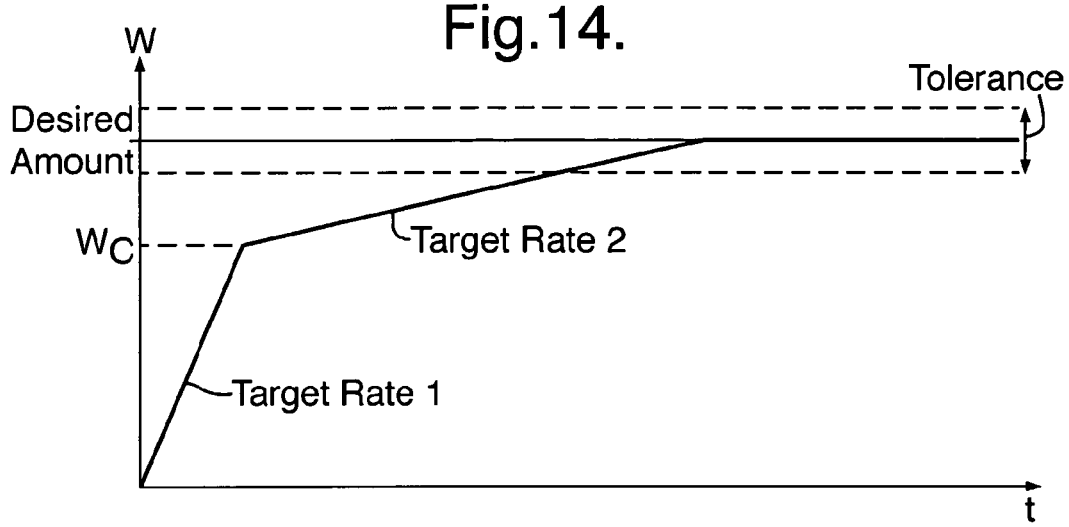
FIG. 14 is a further graph of weight against time which shows how the target dispense rate can be varied over time.
Figure 16:
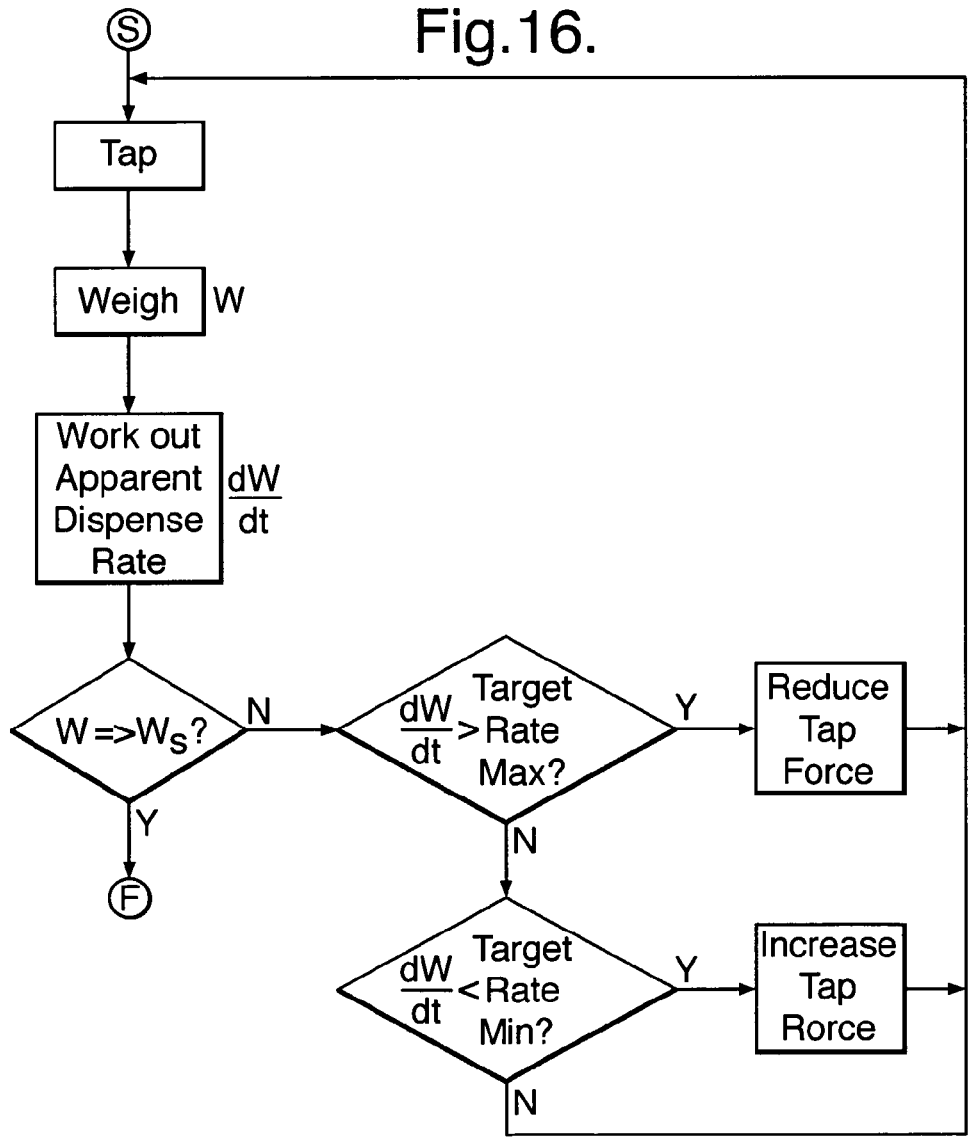
FIG. 16 is yet a further flow diagram which exemplifies a method similar to the first embodiment, but which uses dispense rate control.

This is achieved by predetermining a target dispense rate which is intended to correspond to the actual dispense rate achieved at any one time. FIG. 14 shows a graph of weight against time which shows a preferable configuration of how the target dispense rate changes with time. As can be seen, the target dispense rate reflects the fact that a large dispense rate is required early on but a slower dispense rate is required as the actual weight dispensed reaches the target amount. The processor checks to see if the measured apparent weight value (or the estimated actual weight value if appropriate) has reached a predetermined value $W_C$. If it has, the target dispense rate is reduced to a different, lower, predetermined value as shown in FIG. 14. The ratio of desired amount to $W_C$ is usually kept constant and so $W_C$ can easily be obtained by multiplying the desired final weight by this ratio. As previously discussed, the reduction in target dispense rate has the effect of causing the actuator to tap less hard and so dispense fewer particles per unit time.

Figure 15:
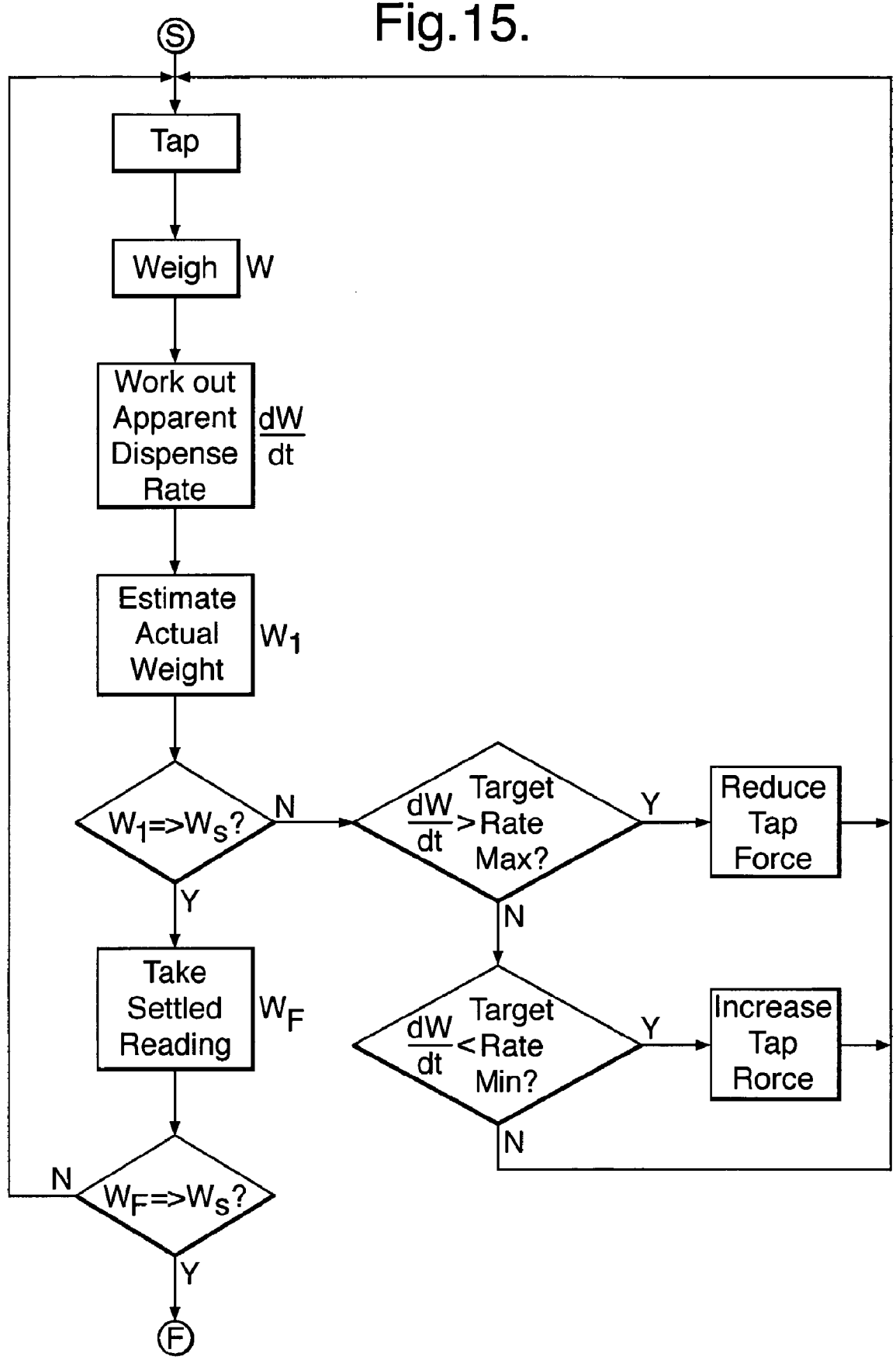
FIG. 15 is a further flow diagram which exemplifies a method similar to the second or third embodiments, but utilising dispense rate control and in which a settled reading is output.

FIG. 15 shows a flow diagram similar to that of FIG. 8 in which the above-described feature of the fourth embodiment is combined with the method of the second embodiment. The main difference is that the calculated dispense rate (dW/dt) is compared to the target rate and the force of tapping is adjusted accordingly (by appropriately adjusting the characteristic of the signal supplied to the particle release actuator). The calculated dispense rate is compared with minimum and maximum target dispense rate values (min and max). If the calculated rate is too low, the tap power on the next and subsequent cycles is increased. If the calculated rate is too high, the tap power on the next and subsequent cycles is reduced. Thus, initially, when a high target rate is set (by setting high values of max and min), the tap power will be increased until this target rate is achieved. The values of max and min can be set to be identical but in general are different to allow a range of acceptable target rates at any time.

The choice of value of the target rate is in general determined by the absolute value of the estimated actual weight so that as the estimated actual weight increases, the set target rate will drop and the tap power will decrease accordingly. This enables accurate dosing to be achieved in a reduced amount of time. Although two target rates are shown in FIG. 14, more rates might be used or a constantly adjusting target rate (inversely proportional to estimated actual weight for example) could be used.

While control based on an estimated weight works well in practice, for regulatory reasons it is often necessary to know the exact final weight of particles in the cassette before the cassette is sealed. Thus, a further step of taking a settled reading is made in this (FIG. 15) embodiment. This step is taken if the comparison based on estimated weight shows that enough particles have been dispensed. A settled reading is taken by allowing the balance enough time (e.g. 2 or 3 seconds) to settle so that a true weight of particles dispensed is obtained. In practice, a number of consecutive samples (e.g. 30 for a Sartorius MC5 balance) may be taken from the balance and these may be compared to determine whether as settled reading has been obtained. For example, a settled reading can be assumed when the value of each of the 30 samples varies by less than some predetermined amount, e.g. 2 μg If this true settled weight reading falls short of the required amount, then further taps can be given until the correct amount is obtained. Taking a settled reading provides certainty as to the exact mass of particles that have been dispensed.

It is to be noted that a settled reading may, and usually will, be taken in the embodiments of FIGS. 5 and 8 as well (this is not shown) and is not limited to the FIG. 15 embodiment. Equally, the step of taking a final settled reading may be omitted from the FIG. 15 embodiment if it is not necessary to know the actual final weight of particles dispensed with high accuracy.

The need to estimate the actual weight based on correcting the measured apparent weight value is reduced if a fast settling balance is used. Thus, the method of FIG. 16 may be carried out such that the apparent dispense rate is calculated only for the purposes of adjusting the tap power, and not to estimate the actual weight using the apparent dispense rate.

Preferred Embodiment of Apparatus

Figure 17:
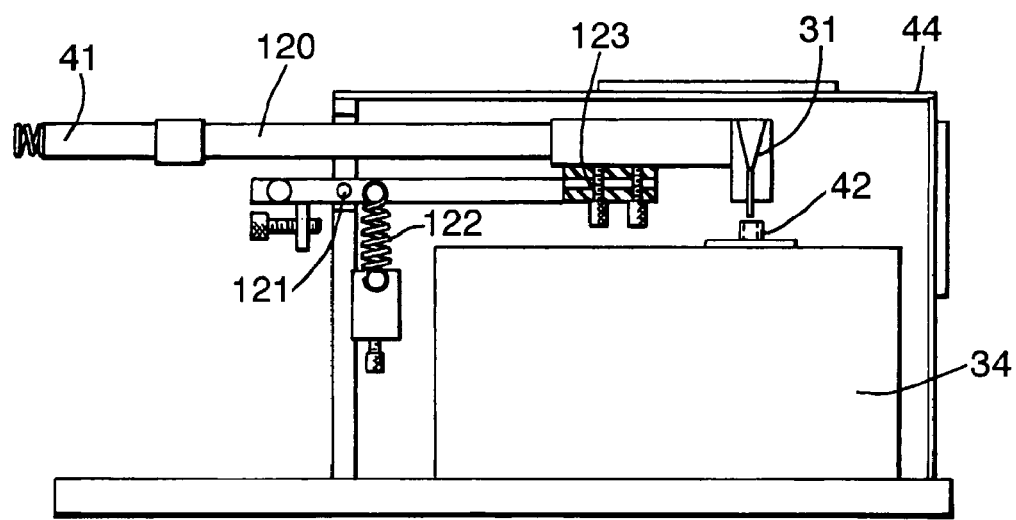
FIG. 17 shows, in schematic side elevation, a preferred apparatus for use in carrying out a method of the present invention.

FIG. 17 shows a particular embodiment of the apparatus which is suitable to carry out any of the above methods. Like reference numerals denote like parts in FIG. 4. As can be seen, in this embodiment, the actuator 41 is spaced apart from the particle retainer 31 by means of a rod 120. This has a practical reason in that the actuator 41 produces electrical and magnetic fields which can interfere with the sensitive components of the weight measuring device 34. The rod 120 serves to transmit the horizontal impact energy created by the actuator 41 to the side of the particle retainer 31.

Also, in this embodiment, the particle retainer 31 and the actuator 41 are supported by means of a pivot 121 and a spring 122. This allows the lower end of the particle retainer to be lifted and lowered so that it may fit inside the cassette cavity thereby reducing any risks of the particles failing to enter the cassette. The particle retainer can be lifted to allow the full cassette to be replaced by an empty one. The particle retainer 31 is mounted on elastomeric supports 123 so that the impact energy from the actuator is rapidly damped after each tap so that there is no further movement on the sieve. The supports 123 also prevent the impact energy being transmitted to the balance.

Further Embodiments of Apparatus

If large numbers of filled cassettes are to be produced then it is desirable to implement manufacturing systems and production lines which can produce such a large number of cassettes with minimal human input. It is further desirable that such systems and production lines are compatible with the clean room environment in which it is often essential to handle drugs and genetic material.

Figure 18:
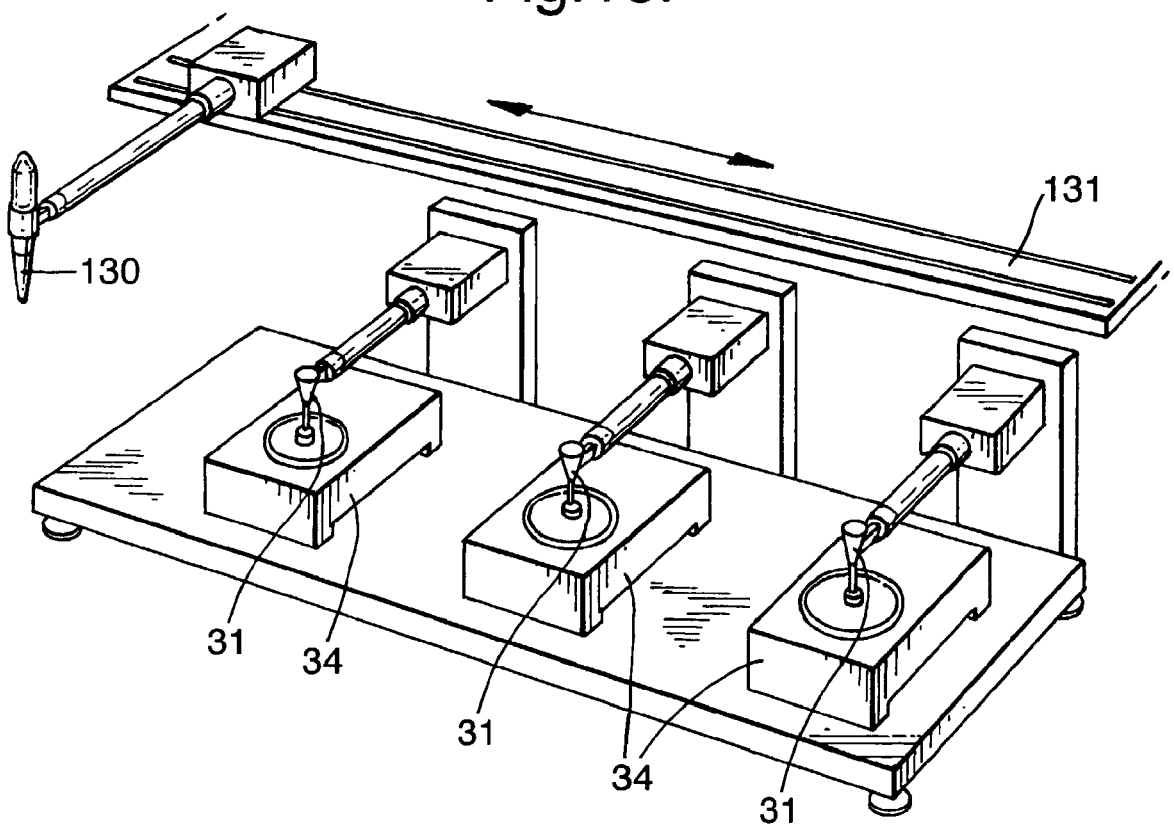
FIG. 18 shows, in a perspective view from above, three devices according to the present invention arranged as a particle dispensing station.

FIG. 18 shows a particle dosing station which comprises three dispensing devices according to the present invention. Furthermore, there is provided a batch hopper 130 which is movable along a track 131 so as to refill the particle retainer 31 of the separate devices. In this embodiment, each particle retainer would carry approximately 30 minutes capacity of particles and the batch hopper 130 is operable to refill each particle retainer when it is empty. This minimises the opportunity for stratification in the particle retainer 31. It also allows the particles to be handled solely by machine so that there is less risk of contamination by humans.

Figure 19:
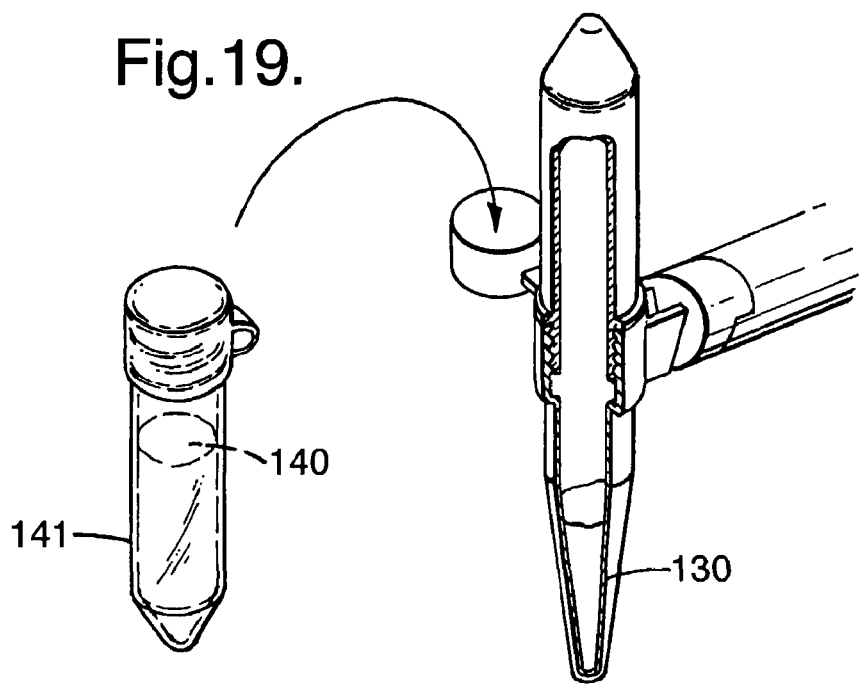
FIG. 19 shows, in partially cut away side elevation, a sample tube and the batch hopper of the FIG. 18 apparatus.

The batch hopper shown FIG. 18 is shown in more detail in FIG. 19. As can be seen, the particles 140 come prepackaged in a sample tube 141 which can be inverted and directly mounted to the batch hopper 130. The batch hopper itself could comprise a particle retainer similar to those of the dosing devices so that a set dose of particles is dispensed to each particle retainer on the production line. Of course much less accuracy is required and so a much higher target dispense rate can be used.

It is envisaged that the sample tube can be quickly and easily attached to the batch hopper and would contain enough particles for many hours production. Also, the batch hopper 130 could be made according to any known dispensing technology and is not limited to the dispensing method of the present invention.

Figure 20:
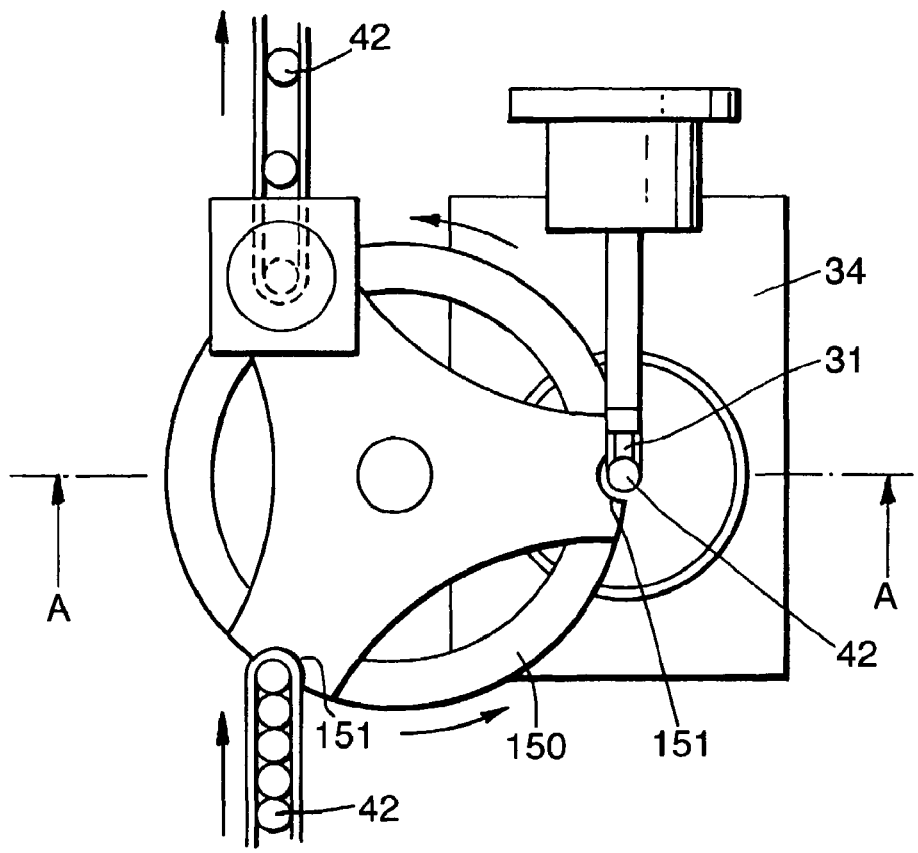
FIG. 20 shows schematically, in top plan view, a manufacturing device as provided by the present invention.

FIG. 20 shows a manufacturing station which is capable of taking open cassettes and outputting closed, correctly dosed, cassettes.

Figure 21:
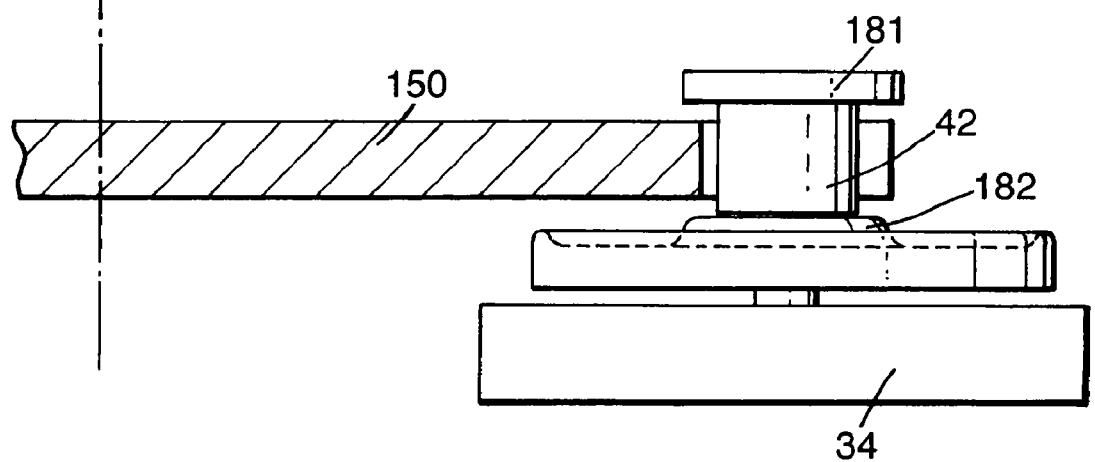
FIG. 21 is a partially cut-away sectional view along the line A-A in FIG. 20.

This apparatus comprises a means 150 for moving an open cassette 42 onto the weight measuring device 34 and means for removing the cassette from the weight measuring device once the cassette has been filled. The apparatus also comprises a means 152 for closing the cassette once filled. In this embodiment, the means for moving the cassette comprises a circular ring 150 rotatable about its centre and having cassette location means 151 (three in FIG. 20) located around its circumference. FIG. 21 shows a cross-sectional side view along the line A-A in FIG. 20. As can be seen, the location means 151 support the cassette 42 under a flange 181 on the cassette. At the cassette input position the cassette is moved into one of the location means by the action of a conveyor. When the wheel rotates the cassette is transferred to the dosing position at which point it is lifted clear of the location means 151 by a raised surface 182 on the pan of the balance 134. The wheel is then reversed by a small increment thereby leaving the cassette on the balance with no contact against the location means. After the cassette is filled, the wheel rotates again and the cassette is transferred to the cassette output position, where it is firstly sealed, and then removed from the wheel by the action of a second conveyor.

Alternatively, the locating means 151 could be operable to grab and release a cassette 42 upon signals given to it by a central controller.

This embodiment enables three tasks to be undertaken simultaneously. Whilst one location means is taking a new cassette, another is near a cassette being dosed and another is holding a cassette being sealed.

The manufacturing station described has the advantage that the cassettes are closed very shortly after being filled which minimises the risk of particle spillage and contamination. Also, it is possible to achieve a rapid transfer between removing a full cassette and providing an empty cassette to the balance which minimises the disturbance to the balance.

Figure 22:
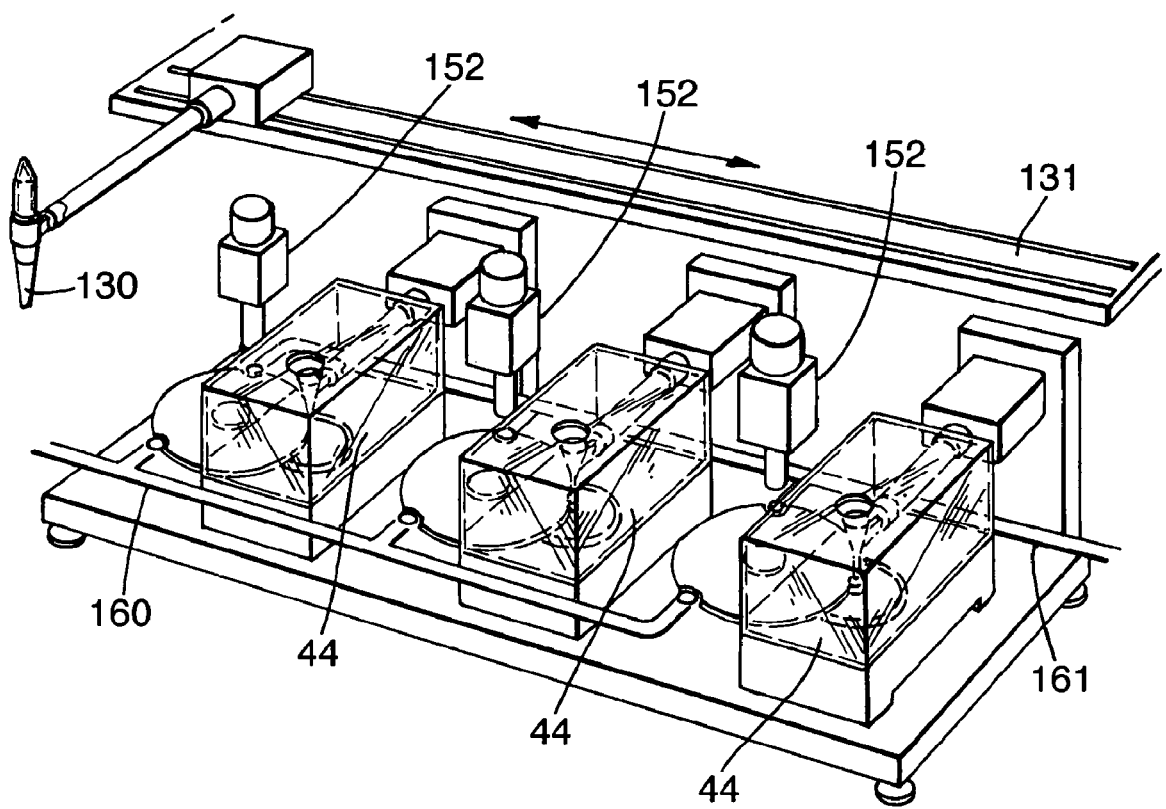
FIG. 22 shows schematically, in a perspective view from above, an exemplary embodiment of the invention for use in a large scale production run.

The manufacturing station of FIG. 20 may be combined with the batch hopper system of FIG. 18 so as to yield the production line shown in FIG. 22. Here, the operator is only required to supply a number of open cassettes 47 to a cassette in-feed track 160 and the cassettes are dosed and closed automatically. The finished product is supplied to an out-feed track 161. Minimal operator input is therefore required.

The cassette in-feed and out-feed tracks 160, 161 could be combined with the apparatus of FIG. 18 so as to provide a manufacturing station that has the function of loading cassettes with particles but not necessarily sealing the cassettes. The in-feed track 160 and the out-feed track 161 maybe made up of a basic conveyor system which transports the cassettes using a moving belt. Alternatively, if the cassette configuration of FIG. 21 is used, the conveyor could consist of two metal tracks which the flange 182 of each cassette rests on. The cassettes would then serve to push each other along the track so that no specific motive means is required. When the cassettes are not required to be closed at the same manufacturing station as they are being dosed, the in-feed and out-feed tracks could take a course which simply traverses the balance. A raised portion on the balance (as has already been described) would then serve to lift the cassette from the track to enable accurate weight measurement. Whatever form the conveyor takes, it is advantageously controlled by the same processor as is used to control the dispensing apparatus.

In the apparatus of the present invention, the delivery rate is controllable over a wide range by varying the frequency of taps, impact energy of taps and the aperture size. Any of these parameters may vary in order to provide a device appropriate to the particular type of particle being dispensed.

The closed loop system described has the advantage that it is tolerant of material variabilities as well as process condition variabilities. It overcomes the fact that the delivery per tap is not necessarily precise.

Also, the present invention has the advantage that there is a very low risk of damaging the particles. This is particularly advantageous when dispensing DNA coated gold particles. In addition, there are no relatively moving parts to the hardware and so there is less opportunity for the particles to become trapped and damaged. Also, the simplicity of the device makes it compatible with a clean room environment which is often required when dosing pharmaceutical compounds.

The particle retainer 31 of the present invention could be removable and disposable so that separate particle retainer could be used for different drugs. This avoids the problems of batch cross over which may occur if the same retainer is used with different particle types.

Sometimes, the particles may become compacted in the particle retainer 31 leading to lower overall dispense rates and longer dispense times. To alleviate this, the particle retainer could be double-ended and invertible with a sieve at each end. At various points in time dictated by the processor 33, the particle retainer could be inverted through 180° so that dispensing continues through the other sieve. This would prevent undue compaction of the particles in the retainer and ensure smooth and speedy dispensation for the whole time particles are left in the particle retainer. Alternatively, stirring or other disrupting means could be used to break down the compaction. Another way to solve this problem is to use a standard particle retainer having a closed top, and sequentially invert it twice (ie turn it through 360°). This would disrupt the compaction and allow faster dispensation. Disruption of this sort could be carried out regularly, for example, every 10 minutes. Alternatively (or in addition), standard fluidisation techniques could be used to limit particle compaction.

Because of the enclosure to isolate the weight measuring device from the effects of draughts, it has been found that the present invention operates satisfactory even in high air movement such as that found in laminar flow chambers. Thus, the present invention is able to be effectively used in a laminar flow area when particularly clean conditions are required.

Figure 23:
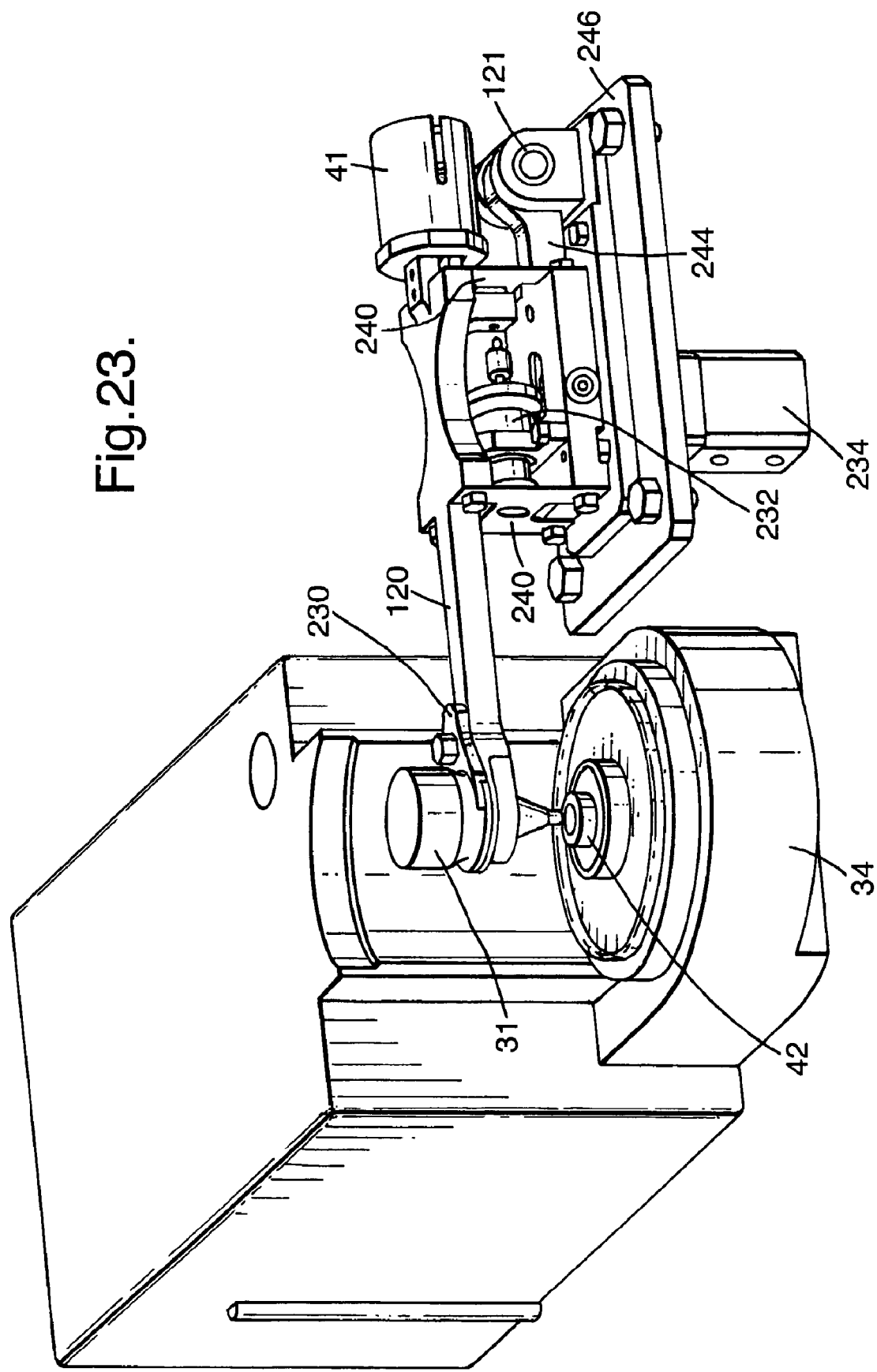
FIG. 23 is a perspective view of a particle dispensing device in accordance with the present invention having a removable clamp and a pneumatic raising/lowering device.
Figure 24:
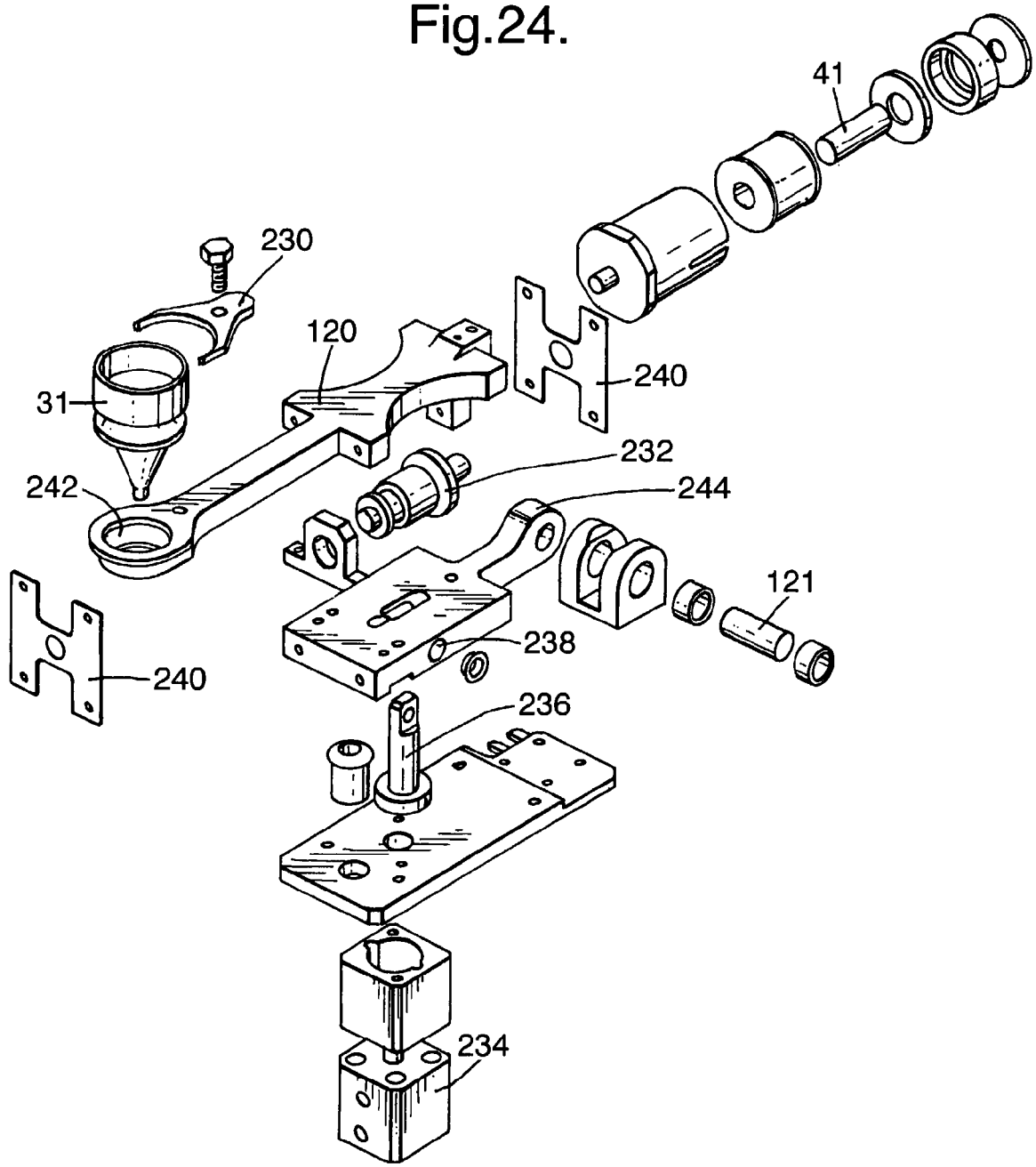
FIG. 24 is an exploded view of part of FIG. 23.
Figure 25:
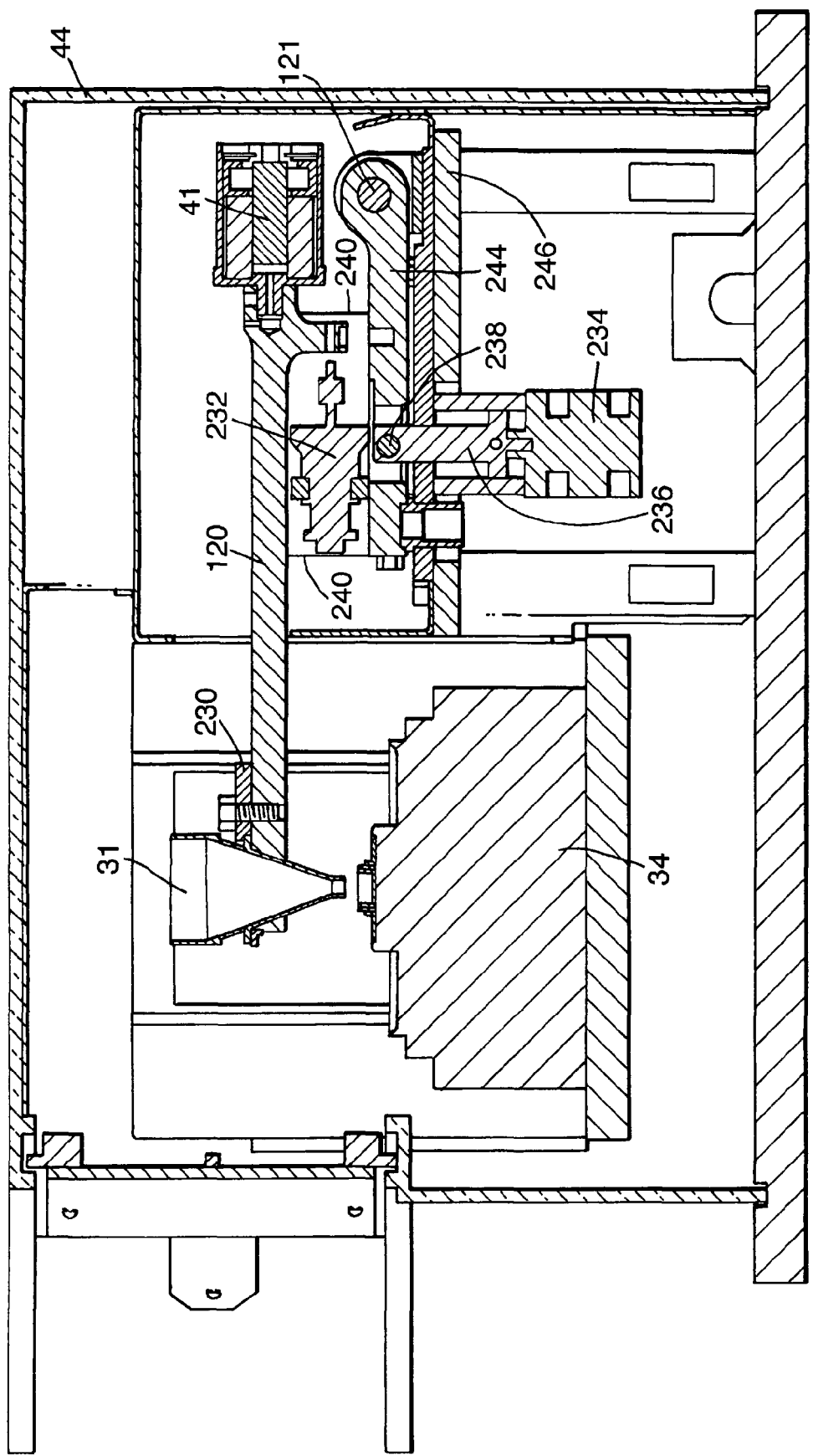
FIG. 25 is a cross-sectional side-on view of the apparatus shown in FIG. 23.

FIGS. 23 to 25 show a perspective view of a further embodiment of a particle dispensing device which is similar to that shown in FIG. 17. The hopper 31 is attached to the rod 120 by a clamp 230. As can be seen from FIG. 24, the clamp 230 is fastened to the rod by a bolt and engages a groove in the external surface of the hopper so as to prevent movement in a vertical direction. The hopper 31 sits in a conical hole 242 at one end of rod 120 and is thereby prevented from moving laterally with respect to the rod 120. Like in the FIG. 17 embodiment, a solenoid actuator 41 is disposed at the other end of rod 120 so as to impart a substantially horizontal impulse of force to the rod 120 and thereon to the hopper 31. The rod 120 is connected to a member 244 by two suspension arms 240. These arms 240 are designed to be relatively flexible in the horizontal direction so that the rod 120 is able to translate horizontally with respect to the member 244. This movement is damped by damping cylinder 232 connected to one or both of the arms 240 and to the member 244. The member 244 is pivoted about pin 121 to a base plate 246 which is immovable. This construction allows most of the dispensing apparatus comprising the member 244, the cylinder 232, the arms 240, the rod 120, the actuator 41, the clamp 230 and the hopper 31 to be pivoted about the axis defined by pin 121. This allows the hopper to be moved substantially vertically so as to bring the sieve 46 into and out of the cassette 42. The lifting and lowering is achieved automatically by a pneumatic actuator 234 disposed below base plate 246. The actuator 234 causes a lifting/lowering member 236 to rise and fall such that a vertical force is transmitted to member 244 via connecting pin 238. In this way, the member 244 may be pivoted about pin 121 to raise and lower the hopper 31.

As already mentioned, the hopper 31 is connected to rod 120 by a clamp 230. This clamp usually ensures that the hopper cannot move relative to the rod 120. It has been found, however, that beneficial effects can be obtained when the clamp 230 is not used so that the hopper merely sits in hole 242 and is able to be perturbed vertically. This clamp-free configuration has been found to be particularly effective when it is desired to dispense particles which tend to adhere to one another or to the hopper or sieve. For example, agarose beads tend to display stickiness which often prevents them form being dispensed at all. If the clamp is not used and the hopper 31 is free to move vertically (and/or to rotate) in the aperture 242, agarose beads may be dispensed. The reason for this is thought to be that the actuator 41 provides a horizontal force which is converted in part to a vertical force at the hopper side walls, possibly due to the tapered nature of these side walls. This vertical force causes the hopper to vibrate vertically, which serves to fluidise the agarose beads, making them easier to dispense. This configuration has the further advantage that the hopper 31 is free to rotate in the aperture 242 and in general, the hopper 31 rotates when the rod 120 is mechanically activated by the actuator 41. These rotations are thought to be due to asymmetries in the components, for example when the plane of the aperture 242 is not precisely horizontal. This rotation of the hopper 31 serves to provide that the actuation force is applied from a slightly different direction on each actuation such that each tap occurs at a different point on the hopper circumference. This helps to prevent the particles from becoming compressed or otherwise stuck together.

Experimental Results

Figure 26:
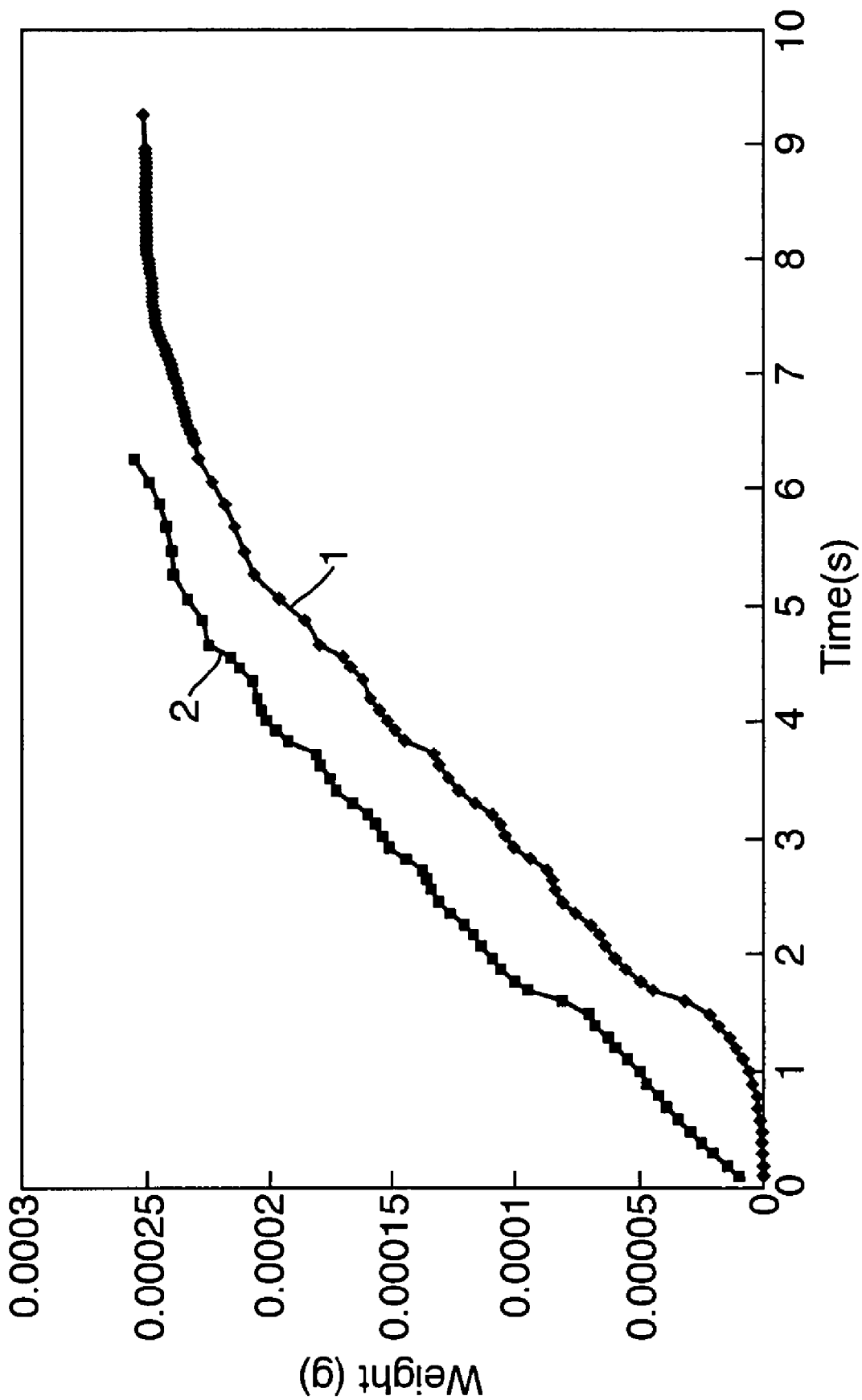
FIG. 26 is a graph showing how the measured apparent weight and estimated actual weight vary during a typical dispense cycle.

FIG. 26 shows a graph having an ordinate of weight in grams and an abscissa of time in seconds. The curve labelled "1" represents the balance reading obtained during a dispense cycle (i.e. the measured apparent weight). The curve labelled "2" represents the determined actual weight, obtained by adding a correction value to the measured apparent weight. The algorithm used to obtain the correction value was that of the third embodiment and dispense rate control was carried out, so that a lower dispense rate was achieved as the target weight of 0.00025 g was approached. The diamonds and squares each represent sample moments and it is to be noted that a sample was taken once after each tap of the actuator.

Initially, the balance is sluggish in responding to the taps of the actuator as can be seen from the measured apparent weight curve "1". At this time, most of the determined actual weight value is made up of the correction value component. For example, after 1 second (and 10 taps of the actuator), the balance reads 6 µg but the actual weight of particles on the balance is predicted to be 50 µg. At this time, the correction value is 44 µg. This correction value tends to stay relatively constant if the hopper is tapped at a fairly constant frequency and with constant force (as with the present experiment). Thus the correction value tends to be around 50 µg for the first 4 seconds of dispensation. As the target weight of 250 µg is approached, the dispense rate control algorithm ensures that the actual dispense rate is reduced by tapping less frequently (5 times a second in this case). As a result, the amount of correction required is reduced meaning that the determined actual weight is more accurate. After 6.2 seconds, the algorithm predicts that the target weight has been exceeded and the hopper is tapped no longer. Weight measurement samples are then taken at a rate of 30 times per second. These samples continue to be taken until it is found that the present sample and another one taken 1 second ago are different by less than some predetermined amount (e.g. 2 µg). In fact, the balance settles to a relatively constant value after about 8 seconds and after 9 seconds, the dispensation is complete, the measured apparent weight "1" now representing the true weight of particles on the balance. This final reading is stored in a memory and is regarded as the true weight of particles that were dispensed.

Experiments to dispense three different powder compounds were conducted using the correction algorithm of the third embodiment together with the target dispense rate control of the fourth embodiment. A Sartorius MC5 balance (the static settling for which is shown in FIG. 7) was used. The powder compounds and target dispense weights tested were Lidocaine (1 mg), BSA (0.5 mg) and Agarose (0.25 mg). The table below shows the average weight actually dispensed (in mg) and the standard deviation from this average. The table also shows what minimum and maximum weights were dispensed in a 50 sample experiment. As can be seen, the minimum and maximum values stray from the average value by about 0.05 mg or less. The standard deviation is 2 or 3% of the average indicating very good dispense repeatability. The table also shows the time in seconds that it took for the dispense to be achieved. This is typically around 8 seconds for all the powder types. Interestingly, Agarose, which has been found to be difficult to dispense using traditional methods due to its poor flowability was dispensed with a standard deviation of only 9 µg. However, the time taken to dispense Agarose is more varied showing a standard deviation of 15% of the average as compared to 8% for Lidocaine or BSA.

|  | Lidocaine | | BSA | | Agarose | |
|---|---|---|---|---|---|---|
|  | | | Target Dose Wt. | | | |
|  | 1.00 mg Weight (mg) | Time (s) | 0.50 mg Weight (mg) | Time (s) | 0.25 mg Weight (mg) | Time (s) |
| Average | 1.018 | 7.975 | 0.503 | 8.148 | 0.252 | 7.790 |
| Std. Dev. | 0.026 | 0.637 | 0.012 | 0.643 | 0.009 | 1.201 |
| % CV | 2.537 | 7.985 | 2.432 | 7.889 | 3.517 | 15.419 |
| Minimum | 0.944 | 6.678 | 0.463 | 6.810 | 0.237 | 5.208 |
| Median | 1.022 | 8.002 | 0.506 | 8.269 | 0.251 | 7.876 |
| Maximum | 1.062 | 9.445 | 0.528 | 9.323 | 0.276 | 10.313 |

The invention claimed is:

1. Apparatus for dispensing particles, comprising:
a particle retainer for retaining a supply of particles to be dispensed;
a particle release actuator for causing, in response to an actuation signal, some of said supply of particles to be dispensed from said particle retainer;
a weight measuring device for measuring an apparent weight of particles dispensed from said particle retainer and for outputting a signal representing the measured apparent weight of the particles dispensed;
a processor operatively connected to said particle release actuator and arranged to provide said actuation signal thereto, said processor also being operatively connected to said weight measuring device and being arranged to receive said measured apparent weight signal therefrom;
wherein said processor is arranged to vary the number of particles to be dispensed by varying a characteristic of the actuation signal it provides to said particle release actuator;
wherein said particle release actuator is arranged, upon receiving said actuation signal, to transmit a discrete impulse of force to said particle retainer; and
wherein the energy of said discrete impulse of force corresponds to a characteristic of said actuation signal provided to said particle release actuator, whereby the number of particles dispensed from said particle retainer is related to the energy of said discrete impulse of force.

2. Apparatus according to claim 1, wherein said particle release actuator is spaced apart from said particle retainer by means of a rod.

3. Apparatus according to claim 2, wherein said particle retainer and particle release actuator are supported by a pivot and a spring so that a lower end of the particle retainer may be lifted out of, and lowered into, a particle cassette cavity.

4. Apparatus according to claim 1, wherein said particle release actuator is a solenoid.

5. Apparatus according to claim 1, wherein said particle retainer comprises a plurality of apertures through which said particles are dispensed.

6. A method of dispensing particles, said method comprising the steps of:
retaining a supply of particles to be dispensed;
providing an actuation signal having a characteristic corresponding to the number of particles to be dispensed;
transmitting a discrete impulse of force to said retained supply of particles, wherein the energy of said discrete impulse of force corresponds to said characteristic of said actuation signal, to thereby cause some of said supply of particles to be dispensed, wherein the number of particles dispensed is related to the energy of said discrete impulse of force;
measuring an apparent weight of particles dispensed and outputting a signal representing the measured apparent weight of the particles dispensed; and
varying said characteristic of said actuation signal in order to vary the number of particles to be dispensed.

7. A method according to the claim 6, wherein said discrete impulse of force is provided by a horizontally disposed solenoid.

8. A method according to claim 6, wherein said particles are dispensed through a plurality of apertures.

9. Apparatus for dispensing particles, comprising:
a particle retainer for retaining a supply of particles to be dispensed;
a particle release actuator for causing, in response to an actuation signal, some of said supply of particles to be dispensed from said particle retainer;
a weight measuring device for measuring an apparent weight of particles dispensed from said particle retainer and for outputting a signal representing the measured apparent weight of the particles dispensed;
wherein the number of particles dispensed from said particle retainer is related to a characteristic of said actuation signal provided to said particle release actuator; and
wherein there is provided an actuation signal having a characteristic that causes fewer particles to be dispensed as the weight of particles already dispensed approaches a target weight.

10. A method of dispensing particles, said method comprising the steps of:
retaining a supply of particles to be dispensed;
providing an actuation signal having a characteristic corresponding to a number of particles to be dispensed;
transmitting a force to said retained supply of particles to thereby cause some of said supply of particles to be dispensed, wherein the number of particles dispensed is related to said characteristic of said provided actuation signal; and
measuring an apparent weight of particles dispensed and outputting a signal representing the measured apparent weight of the particles dispensed; and
varying said characteristics of said actuation signal in order to cause fewer particles to be dispensed as the weight of particles already dispensed approaches a target weight.

11. Apparatus according to claim 9, wherein said particle release actuator is arranged, upon receiving said actuation signal, to transmit a discrete impulse of force to said particle retainer; and wherein the energy of said discrete impulse of force corresponds to a characteristic of said actuation signal provided to said particle release actuator, whereby the number of particles dispensed from said particle retainer is related to the energy of said discrete impulse of force.

12. A method according to claim 10, wherein the force transmitted is a discrete impulse of force, wherein the energy of said discrete impulse of force corresponds to a characteristic of said actuation signal.

* * * * *